(12) United States Patent
Tsai et al.

(10) Patent No.: US 8,687,292 B2
(45) Date of Patent: Apr. 1, 2014

(54) IMAGE SYSTEM LENS ASSEMBLY

(71) Applicant: Largen Precision Co., Ltd., Taichung (TW)

(72) Inventors: Tsung-Han Tsai, Taichung (TW); Ming-Ta Chou, Taichung (TW)

(73) Assignee: Largan Precision Co., Ltd., Taichung (TW)

( * ) Notice: Subject to any disclaimer, the term of this patent is extended or adjusted under 35 U.S.C. 154(b) by 22 days.

(21) Appl. No.: 13/665,106

(22) Filed: Oct. 31, 2012

(65) Prior Publication Data

US 2014/0009844 A1 Jan. 9, 2014

(30) Foreign Application Priority Data

Jul. 4, 2012 (TW) .............................. 101124042 A

(51) Int. Cl.
G02B 9/62 (2006.01)
G02B 3/02 (2006.01)
(52) U.S. Cl.
CPC ........................................ G02B 9/62 (2013.01)
USPC .......................................... 359/761; 359/713

(58) Field of Classification Search
USPC ........................................ 359/713, 756, 761
See application file for complete search history.

(56) References Cited

U.S. PATENT DOCUMENTS 8,054,562 B2 * 11/2011 Asami ........................... 359/761

* cited by examiner

*Primary Examiner* — Jack Dinh
(74) *Attorney, Agent, or Firm* — CKC & Partners Co., Ltd.

(57) ABSTRACT

An image system lens assembly includes, in order from an object side to an image side, a first lens element, a second lens element, a third lens element, a fourth lens element, a fifth lens element and a sixth lens element. The first lens element with negative refractive power has a convex object-side surface and a concave image-side surface. The second lens element has positive refractive power. The third lens element has refractive power. The fourth lens element with negative refractive power has a concave object-side surface and a convex image-side surface. The plastic fifth lens element with positive refractive power has at least one aspheric surface. The plastic sixth lens element with refractive power has a convex object-side surface and a concave image-side surface, and has at least one aspheric surface, wherein the image-side surface thereof changes from concave at a paraxial region to convex at a peripheral region.

29 Claims, 20 Drawing Sheets

IMAGE SYSTEM LENS ASSEMBLY

RELATED APPLICATIONS

The application claims priority to Taiwan Application Serial Number 101124042, filed on Jul. 4, 2012, which is herein incorporated by reference.

BACKGROUND

1. Technical Field

The present invention relates to an image system lens assembly. More particularly, the present invention relates to a compact image system lens assembly applicable to electronic products.

2. Description of Related Art

In recent years, with the popularity of mobile products with camera functionalities, the demand for miniaturizing a photographing lens assembly is increasing. The sensor of a conventional photographing camera is typically a CCD (Charge-Coupled Device) image sensor or a CMOS (Complementary Metal-Oxide Semiconductor) sensor. As advanced semiconductor manufacturing technologies have allowed the pixel size of sensors to be reduced and compact photographing lens assemblies have gradually evolved toward the field of higher megapixels, there is an increasing demand for photographing lens assemblies featuring better image quality.

A conventional compact optical lens system employed in a portable electronic product such as disclosed in U.S. Pat. No. 7,869,142, mainly adopts a four-element lens structure. Due to the popularity of mobile products with high-end specifications, such as smart phones and PDAs (Personal Digital Assistants), the higher pixel and image-quality requirements of the compact optical lens system have increased rapidly. However, the conventional four-element lens structure cannot satisfy the requirements of the compact optical lens system.

Although other conventional optical lens system with five-element lens structure such as disclosed in U.S. Pat. No. 8,000,030 and U.S. Pat. No. 8,000,031 which provide better image quality and higher resolution. However, the object side of the optical lens system does not have a configuration of two lens elements that one has negative refractive power and the other has stronger positive refractive power. Thus, the field of view of the optical lens system cannot be enlarged, and the total track length thereof cannot be reduced. Meanwhile, the aberration and the distortion of the optical lens system cannot be eliminated.

SUMMARY

According to one aspect of the present disclosure, an image system lens assembly includes, in order from an object side to an image side, a first lens element, a second lens element, a third lens element, a fourth lens element, a fifth lens element and a sixth lens element. The first lens element with negative refractive power has a convex object-side surface and a concave image-side surface. The second lens element has positive refractive power. The third lens element has refractive power. The fourth lens element with negative refractive power has a concave object-side surface and a convex image-side surface. The fifth lens element with positive refractive power is made of plastic material, wherein at least one of an object-side surface and an image-side surface of the fifth lens element is aspheric. The sixth lens element with refractive power is made of plastic material and has a convex object-side surface and a concave image-side surface, wherein the image-side surface of the sixth lens element changes from concave at a paraxial region to convex at a peripheral region, and at least one of the object-side surface and the image-side surface of the sixth lens element is aspheric. When a focal length of the image system lens assembly is f, a focal length of the first lens element is f1 and a focal length of the second lens element is f2, the following relationships are satisfied:

$$-0.8 < f/f1 < 0; \text{ and}$$

$$0.7 < f/f2 < 2.4.$$

According to another aspect of the present disclosure, an image system lens assembly includes, in order from an object side to an image side, a first lens element, a second lens element, a third lens element, a fourth lens element, a fifth lens element, and a sixth lens element. The first lens element with negative refractive power has a convex object-side surface and a concave image-side surface. The second lens element has positive refractive power. The third lens element has refractive power. The fourth lens element has negative refractive power. The fifth lens element with positive refractive power is made of plastic material, wherein at least one of an object-side surface and an image-side surface of the fifth lens element is aspheric. The sixth lens element with refractive power is made of plastic material, and has a concave image-side surface, wherein the image-side surface of the sixth lens element changes from concave at a paraxial region to convex at a peripheral region, and at least one of an object-side surface and the image-side surface of the sixth lens element is aspheric. When a focal length of the image system lens assembly is f, a focal length of the second lens element is f2, a sum of central thicknesses of the first through sixth lens elements is ΣCT, and an axial distance between the object-side surface of the first lens element and the image-side surface of the sixth lens element is Td, the following relationships are satisfied:

$$0.55 < \Sigma CT/Td < 0.90; \text{ and}$$

$$0.7 < f/f2 < 2.4.$$

According to yet another aspect of the present disclosure, an image system lens assembly includes, in order from an object side to an image side, a first lens element, a second lens element, a third lens element, a fourth lens element, a fifth lens element, and a sixth lens element. The first lens element with negative refractive power has a convex object-side surface and a concave image-side surface. The second lens element has positive refractive power. The third lens element has refractive power. The fourth lens element has negative refractive power. The fifth lens element with positive refractive power is made of plastic material, wherein at least one of an object-side surface and an image-side surface of the fifth lens element is aspheric. The sixth lens element with refractive power is made of plastic material, and has a convex object-side surface and a concave image-side surface, wherein the image-side surface of the sixth lens element changes from concave at a paraxial region to convex at a peripheral region, and at least one of the object-side surface and the image-side surface of the sixth lens element is aspheric. When a focal length of the image system lens assembly is f, a focal length of the second lens element is f2, and a half of a maximal field of view of the image system lens assembly is HFOV, the following relationships are satisfied:

$$3.0 \text{ mm} < f/\tan(HFOV) < 6.0 \text{ mm}; \text{ and}$$

$$0.7 < f/f2 < 2.4.$$

BRIEF DESCRIPTION OF THE DRAWINGS

The present disclosure can be more fully understood by reading the following detailed description of the embodiment, with reference made to the accompanying drawings as follows.

DETAILED DESCRIPTION

Figure 1:
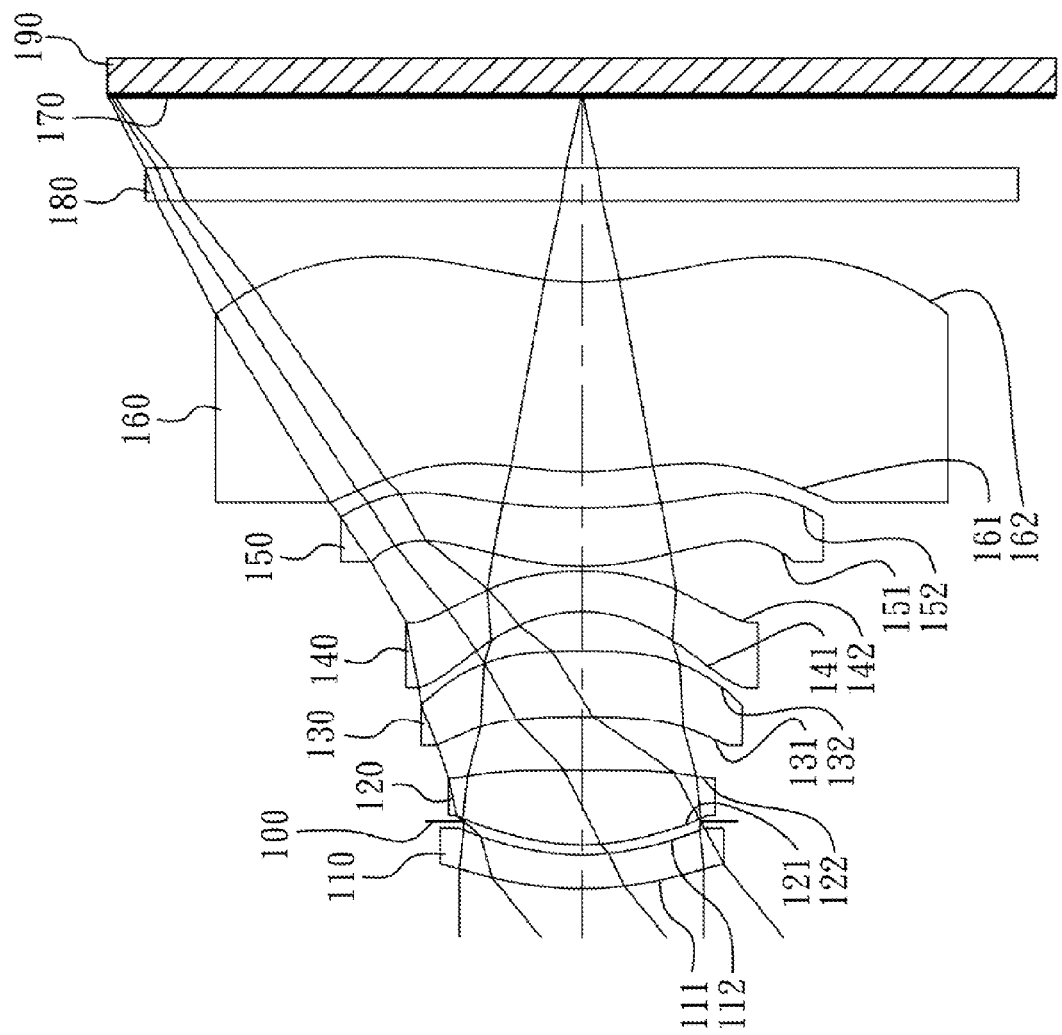
FIG. 1 is a schematic view of an image system lens assembly according to the 1st embodiment of the present disclosure.

An image system lens assembly includes, in order from an object side to an image side, a first lens element, a second lens element, a third lens element, a fourth lens element, a fifth lens element, and a sixth lens element. The image system lens assembly further includes an image sensor located on an image plane.

The first lens element with negative refractive power has a convex object-side surface and a concave image-side surface, so that the field of view of the image system lens assembly can be enlarged by properly adjusting the negative refractive power of the first lens element, and the curvatures of the object-side surface and the image-side surface of the first lens element.

The second lens element has positive refractive power which is stronger than the refractive power of the first lens element. Therefore, the excessive back focal length of the image system lens assembly which is caused by the negative refractive power of the first lens element can be reduced by stronger positive refractive power of the second lens element. The second lens element can have a convex object-side surface, therefore, the aberration and the distortion of the image system lens assembly can be reduced.

The third lens element has refractive power. When the third lens element has positive refractive power, the sensitivity of the image system lens assembly can be reduced. When the third lens element has negative refractive power, the aberration of the image system lens assembly can be corrected.

The fourth lens element with negative refractive power has a concave object-side surface and a convex image-side surface. Therefore, the aberration and the astigmatism of the image system lens assembly can be corrected.

The fifth lens element with positive refractive power is made of plastic material, and can have a convex object-side surface and a concave image-side surface. Therefore, the high order aberration of the image system lens assembly can be corrected by properly adjusting the refractive power of the fifth lens element for improving the resolution so as to obtain better image quality. The object-side surface of the fifth lens element changes from convex at a paraxial region to concave at a peripheral region, and the image-side surface of the fifth lens element changes from concave at a paraxial region to convex at a peripheral region. Therefore, the angle at which the incident light projects onto the image sensor from the off-axis field can be effectively reduced and the aberration can be corrected as well.

The sixth lens element with refractive power is made of plastic material and has a convex object-side surface and a concave image-side surface, wherein the image-side surface of the sixth lens element changes from concave at a paraxial region to convex at a peripheral region. Therefore, a principal point of the image system lens assembly can be positioned away from the image plane, and the back focal length of the image system lens assembly can be reduced so as to maintain the compact size thereof. Moreover, the incident angle of the off-axis field on the image sensor can be effectively minimized and the aberration can be corrected as well.

When a focal length of the image system lens assembly is f, and a focal length of the first lens element is f1, the following relationship is satisfied: $-0.8<f/f1<0$. Therefore, the field of view of the image system lens assembly can be enlarged by properly adjusting the negative refractive power of the first lens element.

When the focal length of the image system lens assembly is f, and a focal length of the second lens element is f2, the following relationship is satisfied: $0.7<f/f2<2.4$. Therefore, the excessive back focal length of the image system lens assembly which is caused by the negative refractive power of the first lens element can be reduced by larger refractive power of the second lens element. Preferably, f and f2 can satisfy the following relationship: $1.0<f/f2<1.8$.

When the focal length of the image system lens assembly is f, the focal length of the first lens element is f1, the focal length of the second lens element is f2, a focal length of the third lens element is f3, a focal length of the fourth lens element if f4, a focal length of the fifth lens element is f5, and a focal length of the sixth lens element is f6, the following relationship is satisfied:

$$f/f2 > f/fi, i=1,3,4,5,6,$$

Therefore, the refractive power of the second lens element is strongest, thus the back focal length of the image system lens assembly can be reduced for maintaining the compact size thereof.

When an axial distance between the first lens element and the second lens element is T12, an axial distance between the second lens element and the third lens element is T23, an axial distance between the third lens element and the fourth lens element is T34, an axial distance between the fourth lens element and the fifth lens element is T45, and an axial distance between the fifth lens element and the sixth lens element is T56, the following relationships are satisfied: $T23>T12$; $T23>T34$; $T23>T45$ and $123>T56$. Therefore, the assembling of the image system lens assembly is easier due to the proper adjustment of the distance between the lens elements, and the manufacturing yield rate of the image system lens assembly can be improved.

When an Abbe number of the fourth lens element is V4, and an Abbe number of the fifth lens element is V5, the following relationship is satisfied: $0.20<V4/V5<0.60$. Therefore, the chromatic aberration of the image system lens assembly can be reduced.

When the focal length of the image system lens assembly is f, and a half of a maximal field of view of the image system lens assembly is HFOV, the following relationship is satisfied: $3.0\ mm < f/\tan(HFOV) < 6.0\ mm$. Therefore, the larger field of view of the image system lens assembly can be obtained.

When a curvature radius of the object-side surface of the sixth lens element is R11, and a curvature radius of the image-side surface of the sixth lens element is R12, the following relationship is satisfied: $-0.10<(R11-R12)/(R11+R12)<0.45$. Therefore, the astigmatism can be corrected by properly adjusting the curvature of the surfaces of the sixth lens element.

When a sum of central thicknesses of the first through sixth lens elements is $\Sigma CT$, and an axial distance between the object-side surface of the first lens element and the image-side surface of the sixth lens element is Td, the following relationship is satisfied: $0.55<\Sigma CT/Td<0.90$. Therefore, it is favorable for forming and assembling the lens elements of the image system lens assembly by adjusting the thickness of the lens elements, and the fabrication yield rate can be increased. Moreover, the total track length of the image system lens assembly can be reduced for maintaining the compact size thereof. Preferably, $\Sigma CT$ and Td can satisfy the following relationship: $0.65<\Sigma CT/Td<0.90$.

When a maximum image height of the image system lens assembly is ImgH, and an axial distance between the object-side surface of the first lens element and the image plane is TTL, the following relationship is satisfied: $TTL/ImgH<1.8$. Therefore, the compact size of the image system lens assembly can be maintained.

According to the image system lens assembly of the present disclosure, the lens elements thereof can be made of plastic or glass materials. When the lens elements are made of glass material, the allocation of the refractive power of the image system lens assembly may be more flexible and easier to design. When the lens elements are made of plastic material, the manufacturing costs can be effectively reduced. Furthermore, the surface of each lens element can be aspheric, so that it is easier to make the surface into non-spherical shapes. As a result, more controllable variables are obtained for reducing aberrations, and the number of required lens elements for constructing an image system lens assembly can be reduced. Therefore, the total track length of the image system lens assembly can also be reduced.

According to the image system lens assembly of the present disclosure, each of an object-side surface and an image-side surface of every lens element has a paraxial region and a peripheral region. The paraxial region refers to the region of the surface where light rays travel close to an optical axis and the peripheral region refers to the region of the surface where light rays travel away from the optical axis. Particularly, when a lens element has a convex surface, it indicates that the surface is convex at the paraxial region; and when the lens element has a concave surface, it indicates that the surface is concave at the paraxial region.

According to the image system lens assembly of the present disclosure, there can be at least one stop provided, such as an aperture stop, a glare stop, or a field stop. Said glare stop or said field stop is allocated for reducing the stray light and thereby improving the image resolution thereof. Furthermore, an aperture stop can be configured as a front stop or a middle stop. A front stop can provide a longer distance from an exit pupil of the image system lens assembly to an image plane and thereby the generated telecentric effect improves the image-sensing efficiency of an image sensor. A middle stop is favorable for enlarging the field of view of the image system lens assembly and thereby provides a wider field of view for the same.

The image system lens assembly of the present disclosure has advantages on superb aberration correction and excellent image quality. Therefore, the image system lens assembly can be applicable on the electronic image systems such as 3D (three dimensional) capturing systems, digital cameras, portable devices, and tablet computers, etc.

According to the above description of the present disclosure, the following 1st-10th specific embodiments are provided for further explanation.

1st Embodiment

Figure 2:
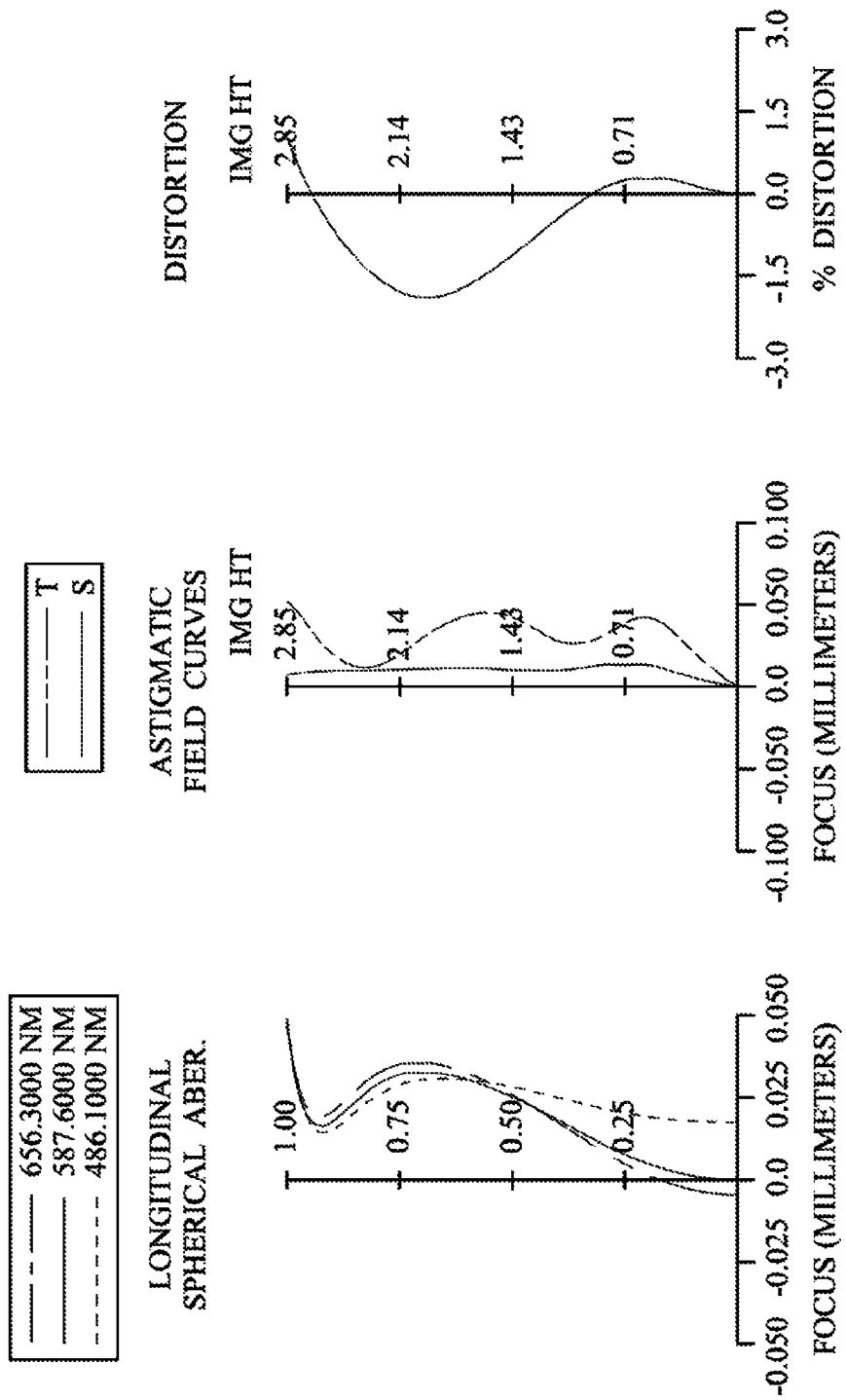
FIG. 2 shows spherical aberration curves, astigmatic field curves and a distortion curve of the image system lens assembly according to the 1st embodiment.

FIG. 1 is a schematic view of an image system lens assembly according to the 1st embodiment of the present disclosure. FIG. 2 shows spherical aberration curves, astigmatic field curves and a distortion curve of the image system lens assembly according to the 1st embodiment. In FIG. 1, the image system lens assembly includes, in order from an object side to an image side, a first lens element 110, an aperture stop 100, a second lens element 120, a third lens element 130, a fourth lens element 140, a fifth lens element 150, a sixth lens element 160, an IR-cut filter 180, an image plane 170, and an image sensor 190.

The first lens element 110 with negative refractive power has a convex object-side surface 111 and a concave image-side surface 112. The first lens element 110 is made of plastic material and has the object-side surface 111 and the image-side surface 112 being aspheric.

The second lens element 120 with positive refractive power has a convex object-side surface 121 and a concave image-side surface 122. The second lens element 120 is made of plastic material and has the object-side surface 121 and the image-side surface 122 being aspheric.

The third lens element 130 with positive refractive power has a concave object-side surface 131 and a convex image-side surface 132. The third lens element 130 is made of plastic material and has the object-side surface 131 and the image-side surface 132 being aspheric.

The fourth lens element 140 with negative refractive power has a concave object-side surface 141 and a convex image-side surface 142. The fourth lens element 140 is made of plastic material and has the object-side surface 141 and the image-side surface 142 being aspheric.

The fifth lens element 150 with positive refractive power has a convex object-side surface 151 and a concave image-side surface 152, wherein the object-side surface 151 of the fifth lens element 150 changes from convex at a paraxial region to concave at a peripheral region, and the image-side surface 152 of the fifth lens element 150 changes from concave at a paraxial region to convex at a peripheral region. The fifth lens element 150 is made of plastic material and has the object-side surface 151 and the image-side surface 152 being aspheric.

The sixth lens element 160 with positive refractive power has a convex object-side surface 161 and a concave image-side surface 162, wherein the image-side surface 162 of the sixth lens element 160 changes from concave at a paraxial region to convex at a peripheral region. The sixth lens element 160 is made of plastic material and has the object-side surface 161 and the image-side surface 162 being aspheric.

The IR-cut filter 180 is made of glass material, wherein the IR-cut filter 180 is located between the sixth lens element 160 and the image plane 170, and will not affect the focal length of the image system lens assembly.

The equation of the aspheric surface profiles of the aforementioned lens elements of the 1st embodiment is expressed as follows:

$$X(Y) = (Y^2/R)/(1 + sqrt(1 - (1+k) \times (Y/R)^2)) + \sum_i (Ai) \times (Y^i)$$

where:

X is the relative distance of a point on the aspheric surface spaced at a distance Y from the optical axis relative to the tangential plane at the aspheric surface vertex on the optical axis;

Y is the distance from the point on the curve of the aspheric surface to the optical axis;

R is the curvature radius;

k is the conic coefficient; and

Ai is the i-th aspheric coefficient.

In the image system lens assembly according to the 1st embodiment, when a focal length of the image system lens assembly is f, an f-number of the image system lens assembly is Fno, and a half of a maximal field of view of the image system lens assembly is HFOV, these parameters have the following values:

f=3.48 mm;
Fno=2.35; and
HFOV=39.0 degrees.

In the image system lens assembly according to the 1st embodiment, when an Abbe number of the fourth lens element 140 is V4, and an Abbe number of the fifth lens element 150 is V5, the following relationship is satisfied:

$V4/V5=0.43$.

In the image system lens assembly according to the 1st embodiment, when a curvature radius of the object-side surface 161 of the sixth lens element 160 is R11, and a curvature radius of the image-side surface 162 of the third lens element 160 is R12, the following relationship is satisfied:

$(R11-R12)/(R11+R12)=0.08$.

In the image system lens assembly according to the 1st embodiment, when the focal length of the image system lens assembly is f, and a focal length of the first lens element 110 is f1, the following relationship is satisfied: $f/f1=-0.43$.

In the image system lens assembly according to the 1st embodiment, when the focal length of the image system lens assembly is f, and a focal length of the second lens element 120 is f2, the following relationship is satisfied: $f/f2=1.41$.

In the image system lens assembly according to the 1st embodiment, a sum of central thicknesses of the first through sixth lens elements (110, 120, 130, 140, 150, 160) is ΣCT, and an axial distance between the object-side surface 111 of the first lens element 110 and the image-side surface 162 of the sixth lens element 160 is Td, the following relationship is satisfied: $\Sigma CT/Td=0.76$.

In the image system lens assembly according to the 1st embodiment, when the focal length of the image system lens assembly is f, and the half of the maximal field of view of the image system lens assembly is HFOV, the following relationship is satisfied: $f/\tan(HFOV)=4.29$ mm.

In the image system lens assembly according to the 1st embodiment, wherein a maximum image height of the image system lens assembly is ImgH which here is a half of the diagonal length of the photosensitive area of the image sensor 190 on the image plane 170, and an axial distance between the object-side surface 111 of the first lens element 110 and an image plane 170 is TTL, the following relationship is satisfied: $TTL/ImgH=1.66$.

The detailed optical data of the 1st embodiment are shown in Table 1 and the aspheric surface data are shown in Table 2 below.

TABLE 1

1st Embodiment
f = 3.48 mm, Fno = 2.35, HFOV = 39.0 deg.

| Surface # | | Curvature Radius | | Thickness | Material | Index | Abbe # | Focal length |
|---|---|---|---|---|---|---|---|---|
| 0 | Object | Plano | | Infinity | | | | |
| 1 | Lens 1 | 2.040 | (ASP) | 0.205 | Plastic | 1.634 | 23.8 | -8.14 |
| 2 | | 1.405 | (ASP) | 0.204 | | | | |
| 3 | Ape. Stop | Plano | | -0.143 | | | | |
| 4 | Lens 2 | 1.338 | (ASP) | 0.452 | Plastic | 1.544 | 55.9 | 2.46 |

TABLE 1-continued

1st Embodiment
f = 3.48 mm, Fno = 2.35, HFOV = 39.0 deg.

| Surface # | | Curvature Radius | | Thickness | Material | Index | Abbe # | Focal length |
|---|---|---|---|---|---|---|---|---|
| 5 | | 2824.909 | (ASP) | 0.320 | | | | |
| 6 | Lens 3 | −8.719 | (ASP) | 0.401 | Plastic | 1.544 | 55.9 | 17.79 |
| 7 | | −4.662 | (ASP) | 0.235 | | | | |
| 8 | Lens 4 | −0.884 | (ASP) | 0.250 | Plastic | 1.634 | 23.8 | −3.05 |
| 9 | | −1.808 | (ASP) | 0.030 | | | | |
| 10 | Lens 5 | 1.667 | (ASP) | 0.350 | Plastic | 1.544 | 55.9 | 4.54 |
| 11 | | 4.749 | (ASP) | 0.222 | | | | |
| 12 | Lens 6 | 2.043 | (ASP) | 1.148 | Plastic | 1.544 | 55.9 | 62.21 |
| 13 | | 1.743 | (ASP) | 0.492 | | | | |
| 14 | IR-cut filter | Plano | | 0.200 | Glass | 1.517 | 64.2 | — |
| 15 | | Plano | | 0.435 | | | | |
| 16 | Image | Plano | | — | | | | |

Reference wavelength (d-line) is 587.6 nm

TABLE 2

Aspheric Coefficients

| | Surface # | | | | | |
|---|---|---|---|---|---|---|
| | 1 | 2 | 4 | 5 | 6 | 7 |
| k = | 1.6472E−01 | −7.5791E+00 | −4.8717E+00 | 0.0000E+00 | 0.0000E+00 | 1.3127E+00 |
| A4 = | −1.2919E−01 | −1.3043E−01 | −1.6992E−01 | −1.5859E−01 | −2.6870E−01 | −2.7551E−01 |
| A6 = | 3.0549E−01 | 8.9705E−01 | 7.9677E−01 | −7.0775E−02 | −3.7395E−02 | −7.6013E−02 |
| A8 = | −5.1378E−01 | −1.8374E+00 | −1.5780E+00 | 2.3790E−01 | −3.3031E−02 | −1.8623E−02 |
| A10 = | 3.7786E−01 | 1.8588E+00 | 1.5716E+00 | −2.5295E−01 | 2.1918E−01 | 2.6555E−01 |
| A12 = | −1.5706E−01 | −7.8278E−01 | −4.4901E−01 | −1.0314E−01 | 2.4226E−01 | −9.4393E−02 |
| A14 = | | | | 6.5730E−01 | −3.0268E−01 | −4.5524E−02 |

| | Surface # | | | | | |
|---|---|---|---|---|---|---|
| | 8 | 9 | 10 | 11 | 12 | 13 |
| k = | −2.9075E+00 | 1.6868E−01 | −9.2581E+00 | 3.0000E+00 | −1.5378E+01 | −2.3992E+00 |
| A4 = | −3.5110E−01 | −3.0448E−01 | 7.8826E−02 | 1.7557E−01 | −1.9002E−01 | −1.8222E−01 |
| A6 = | 1.0562E−01 | 3.3875E−01 | −1.9025E−01 | −3.8131E−01 | 3.5324E−02 | 9.7623E−02 |
| A8 = | 5.0913E−01 | 1.9305E−02 | 9.2275E−02 | 3.0878E−01 | 1.8523E−02 | −4.2574E−02 |
| A10 = | −6.7679E−01 | −1.2167E−01 | −3.0406E−02 | −1.7157E−01 | −1.0336E−02 | 1.2934E−02 |
| A12 = | 5.3047E−01 | 4.7918E−02 | −9.2850E−04 | 6.0698E−02 | 2.2036E−03 | −2.4524E−03 |
| A14 = | −1.8280E−01 | 1.3705E−02 | 2.3757E−03 | −1.1501E−02 | −2.3069E−04 | 2.5592E−04 |
| A16 = | | | | 8.6055E−04 | 9.7129E−06 | −1.1161E−05 |

In Table 1, the curvature radius, the thickness and the focal length are shown in millimeters (mm). Surface numbers 0-16 represent the surfaces sequentially arranged from the object-side to the image-side along the optical axis. In Table 2, k represents the conic coefficient of the equation of the aspheric surface profiles. A1-A16 represent the aspheric coefficients ranging from the 1st order to the 16th order. This information related to Table 1 and Table 2 applies also to the Tables for the remaining embodiments, and so an explanation in this regard will not be provided again.

2nd Embodiment

Figure 3:
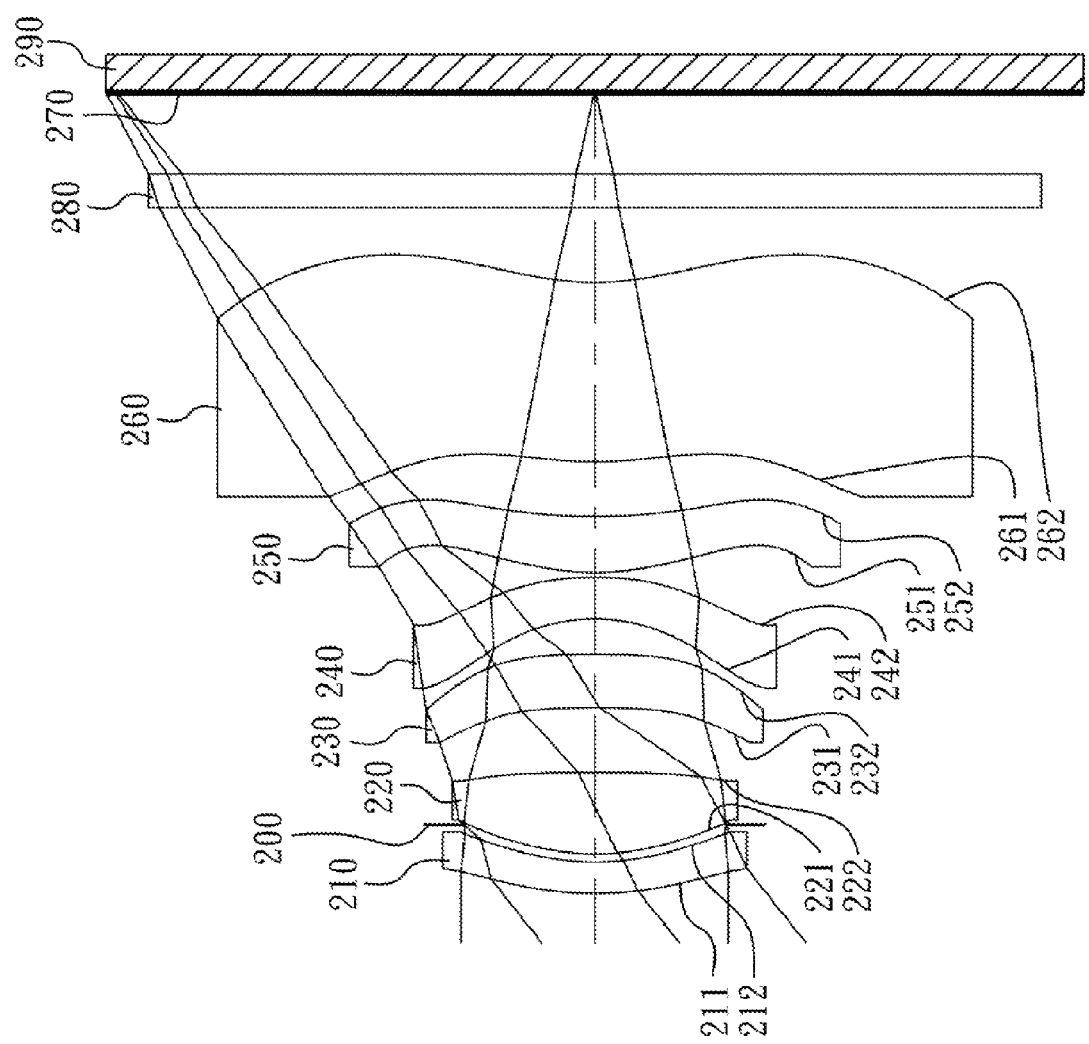
FIG. 3 is a schematic view of an image system lens assembly according to the 2nd embodiment of the present disclosure.
Figure 4:
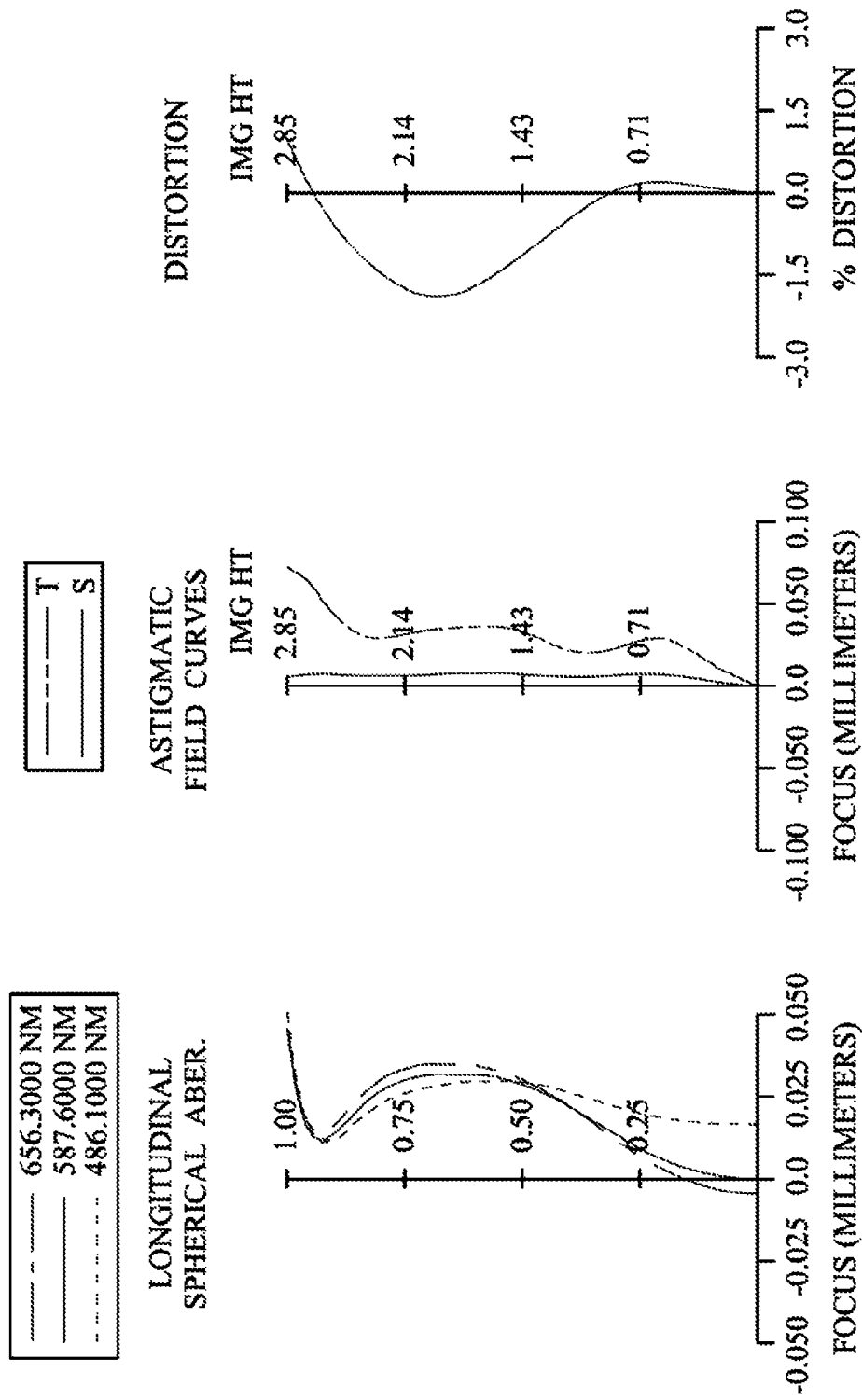
FIG. 4 shows spherical aberration curves, astigmatic field curves and a distortion curve of the image system lens assembly according to the 2nd embodiment.

FIG. 3 is a schematic view of an image system lens assembly according to the 2nd embodiment of the present disclosure. FIG. 4 shows spherical aberration curves, astigmatic field curves and a distortion curve of the image system lens assembly according to the 2nd embodiment. In FIG. 3, the image system lens assembly includes, in order from an object side to an image side, a first lens element 210, an aperture stop 200, a second lens element 220, a third lens element 230, a fourth lens element 240, a fifth lens element 250, a sixth lens element 260, an IR-cut filter 280, an image plane 270 and an image sensor 290.

The first lens element 210 with negative refractive power has a convex object-side surface 211 and a concave image-side surface 212. The first lens element 210 is made of plastic material and has the object-side surface 211 and the image-side surface 212 being aspheric.

The second lens element 220 with positive refractive power has a convex object-side surface 221 and a convex image-side surface 222. The second lens element 220 is made of plastic material and has the object-side surface 221 and the image-side surface 222 being aspheric.

The third lens element 230 with positive refractive power has a concave object-side surface 231 and a convex image-side surface 232. The third lens element 230 is made of plastic material and has the object-side surface 231 and the image-side surface 232 being aspheric.

The fourth lens element 240 with negative refractive power has a concave object-side surface 241 and a convex image-side surface 242. The fourth lens element 240 is made of plastic material and has the object-side surface 241 and the image-side surface 242 being aspheric.

The fifth lens element 250 with positive refractive power has a convex object-side surface 251 and a concave image-side surface 252, wherein the object-side surface 251 of the fifth lens element 250 changes from convex at a paraxial region to concave at a peripheral region, and the image-side surface 252 of the fifth lens element 250 changes from concave at a paraxial region to convex at a peripheral region. The fifth lens element 260 is made of plastic material and has the object-side surface 251 and the image-side surface 252 being aspheric.

The sixth lens element 260 with negative refractive power has a convex object-side surface 261 and a concave image-side surface 262, wherein the image-side surface 262 of the sixth lens element 260 changes from concave at a paraxial region to convex at a peripheral region. The sixth lens element 260 is made of plastic material and has the object-side surface 261 and the image-side surface 262 being aspheric.

The IR-cut filter 280 is made of glass material, wherein the IR-cut filter 280 is located between the sixth lens element 260 and the image plane 270, and will not affect the focal length of the image system lens assembly.

The detailed optical data of the 2nd embodiment are shown in Table 3 and the aspheric surface data are shown in Table 4 below.

TABLE 3

2nd Embodiment
f = 3.58 mm, Fno = 2.25, HFOV = 38.2 deg.

| Surface # | | Curvature Radius | | Thickness | Material | Index | Abbe # | Focal length |
|---|---|---|---|---|---|---|---|---|
| 0 | Object | Plano | | Infinity | | | | |
| 1 | Lens 1 | 2.010 | (ASP) | 0.186 | Plastic | 1.640 | 23.3 | −7.88 |
| 2 | | 1.385 | (ASP) | 0.225 | | | | |
| 3 | Ape. Stop | Plano | | −0.176 | | | | |
| 4 | Lens 2 | 1.362 | (ASP) | 0.484 | Plastic | 1.544 | 55.9 | 2.40 |
| 5 | | −29.180 | (ASP) | 0.386 | | | | |
| 6 | Lens 3 | −6.974 | (ASP) | 0.319 | Plastic | 1.544 | 55.9 | 169.17 |
| 7 | | −6.587 | (ASP) | 0.207 | | | | |
| 8 | Lens 4 | −1.056 | (ASP) | 0.250 | Plastic | 1.640 | 23.3 | −3.76 |
| 9 | | −2.056 | (ASP) | 0.030 | | | | |
| 10 | Lens 5 | 1.619 | (ASP) | 0.330 | Plastic | 1.544 | 55.9 | 4.45 |
| 11 | | 4.536 | (ASP) | 0.328 | | | | |
| 12 | Lens 6 | 2.204 | (ASP) | 1.064 | Plastic | 1.535 | 56.3 | −30.42 |
| 13 | | 1.615 | (ASP) | 0.450 | | | | |
| 14 | IR-cut filter | Plano | | 0.200 | Glass | 1.517 | 64.2 | — |
| 15 | | Plano | | 0.480 | | | | |
| 16 | Image | Plano | | — | | | | |

Reference wavelength (d-line) is 587.6 nm

TABLE 4

Aspheric Coefficients

| | Surface # | | | | | |
|---|---|---|---|---|---|---|
| | 1 | 2 | 4 | 5 | 6 | 7 |
| k = | −2.4152E−01 | −7.3574E+00 | −4.8121E+00 | 0.0000E+00 | 0.0000E+00 | 3.0000E+00 |
| A4 = | −1.3645E−01 | −1.3058E−01 | −1.6634E−01 | −1.1428E−01 | −2.8100E−01 | −3.1542E−01 |
| A6 = | 3.0178E−01 | 8.9077E−01 | 8.4419E−01 | −7.6876E−02 | −2.3605E−03 | −4.7101E−02 |
| A8 = | −5.1267E−01 | −1.8635E+00 | −1.6205E+00 | 2.3489E−01 | −3.8961E−02 | −7.3475E−03 |
| A10 = | 3.5517E−01 | 1.7971E+00 | 1.4741E+00 | −2.1480E−01 | 1.7937E−01 | 2.6066E−01 |
| A12 = | −1.2227E−01 | −7.1153E−01 | −4.0218E−01 | −1.3542E−01 | 1.9820E−01 | −1.0989E−01 |
| A14 = | | | | 4.7318E−01 | −2.4117E−01 | −3.3130E−02 |

| | Surface # | | | | | |
|---|---|---|---|---|---|---|
| | 8 | 9 | 10 | 11 | 12 | 13 |
| k = | −3.7723E+00 | 2.5026E−01 | −8.6057E+00 | 3.0000E+00 | −1.4098E+01 | −2.6292E+00 |
| A4 = | −3.3722E−01 | −2.9325E−01 | 7.8826E−02 | 1.7557E−01 | −1.9002E−01 | −1.8222E−01 |
| A6 = | 9.7329E−02 | 3.1764E−01 | −1.9025E−01 | −3.8131E−01 | 3.5324E−02 | 9.7623E−02 |
| A8 = | 4.8557E−01 | 8.5644E−03 | 9.2275E−02 | 3.0878E−01 | 1.8523E−02 | −4.2574E−02 |
| A10 = | −6.8448E−01 | −1.1897E−01 | −3.0406E−02 | −1.7157E−01 | −1.0336E−02 | 1.2934E−02 |
| A12 = | 5.4015E−01 | 5.1469E−02 | −9.2850E−04 | 6.0698E−02 | 2.2036E−03 | −2.4524E−03 |
| A14 = | −1.7634E−01 | 1.2937E−02 | 2.3757E−03 | −1.1501E−02 | −2.3069E−04 | 2.5592E−04 |
| A16 = | | | | 8.6055E−04 | 9.7129E−06 | −1.1161E−05 |

In the image system lens assembly according to the 2nd embodiment, the definitions of f, Fno, HFOV, V4, V5, R11, R12, f1, f2, ΣCT, Td, TL, and ImgH are the same as those stated in the 1st embodiment with corresponding values for the 2nd embodiment. Moreover, these parameters can be calculated from Table 3 and Table 4 as the following values and satisfy the following relationships:

| | | | |
|---|---|---|---|
| f (mm) | 3.58 | f/f1 | −0.45 |
| Fno | 2.25 | f/f2 | 1.49 |
| HFOV (deg.) | 38.2 | ΣCT/Td | 0.72 |
| V4/V5 | 0.42 | f/tan(HFOV) (mm) | 4.54 |
| (R11 − R12)/(R11 + R12) | 0.15 | TTL/ImgH | 1.64 |

3rd Embodiment

Figure 5:
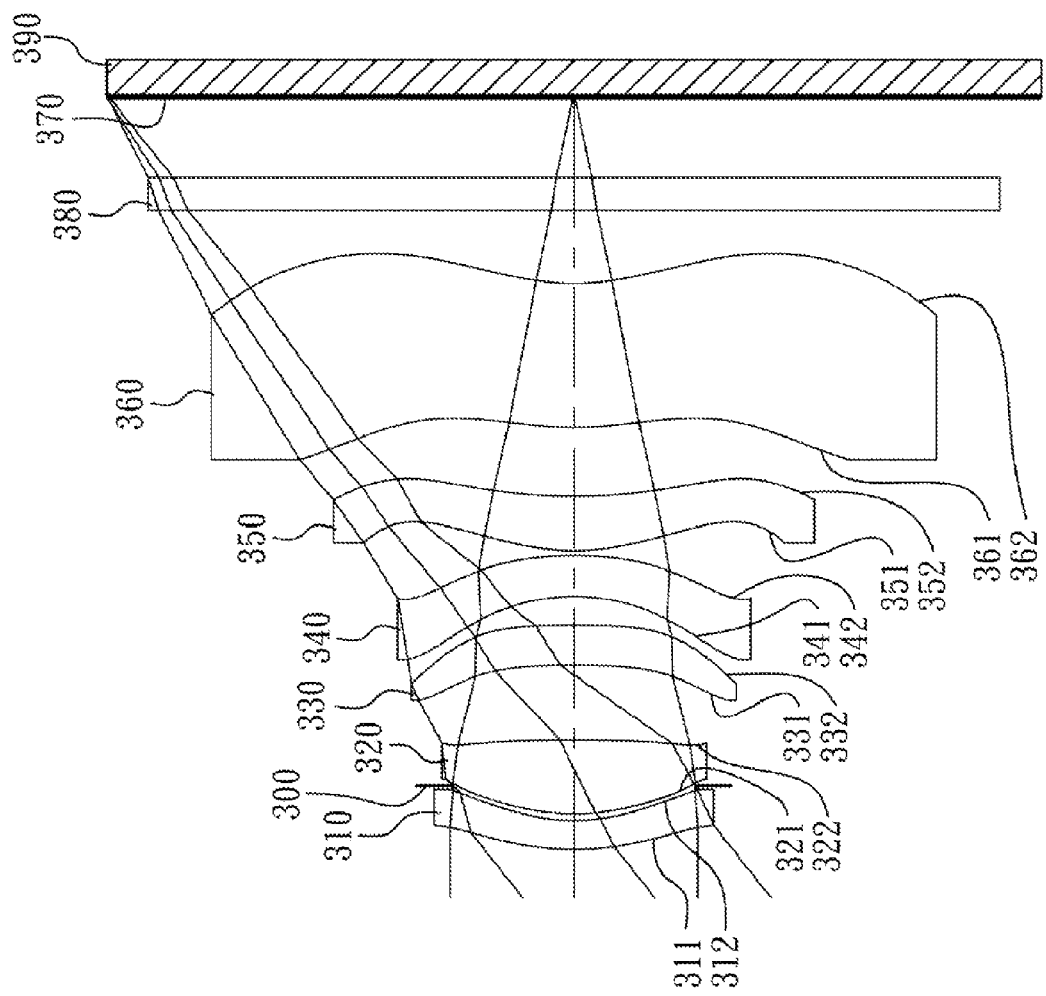
FIG. 5 is a schematic view of an image system lens assembly according to the 3rd embodiment of the present disclosure.
Figure 6:
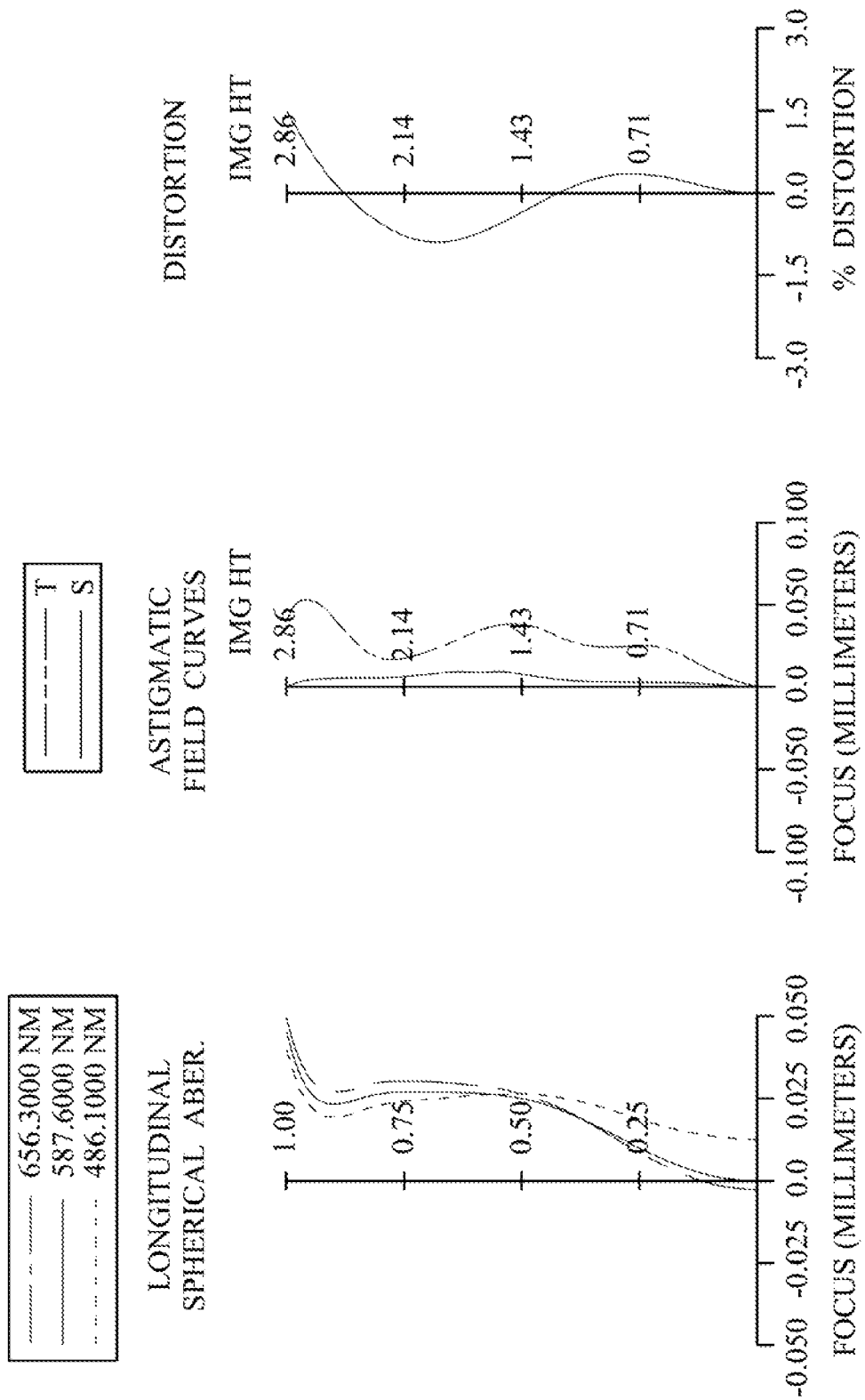
FIG. 6 shows spherical aberration curves, astigmatic field curves and a distortion curve of the image system lens assembly according to the 3rd embodiment.

FIG. 5 is a schematic view of an image system lens assembly according to the 3rd embodiment of the present disclosure. FIG. 6 shows spherical aberration curves, astigmatic field curves and a distortion curve of the image system lens assembly according to the 3rd embodiment. In FIG. 5, the image system lens assembly includes, in order from an object side to an image side, a first lens element 310, an aperture stop 300, a second lens element 320, a third lens element 330, a fourth lens element 340, a fifth lens element 350, a sixth lens element 360, an IR-cut filter 380, an image plane 370, and an image sensor 390.

The first lens element 310 with negative refractive power has a convex object-side surface 311 and a concave image-side surface 312. The first lens element 310 is made of plastic material and has the object-side surface 311 and the image-side surface 312 being aspheric.

The second lens element 320 with positive refractive power has a convex object-side surface 321 and a convex image-side surface 322. The second lens element 320 is made of plastic material and has the object-side surface 321 and the image-side surface 322 being aspheric.

The third lens element 330 with negative refractive power has a concave object-side surface 331 and a convex image-side surface 332. The third lens element 330 is made of plastic material and has the object-side surface 331 and the image-side surface 332 being aspheric.

The fourth lens element 340 with negative refractive power has a concave object-side surface 341 and a convex image-side surface 342. The fourth lens element 340 is made of plastic material and has the object-side surface 341 and the image-side surface 342 being aspheric.

The fifth lens element 350 with positive refractive power has a convex object-side surface 351 and a concave image-side surface 352, wherein the object-side surface 351 of the fifth lens element 350 changes from convex at a paraxial region to concave at a peripheral region, and the image-side surface 352 of the fifth lens element 350 changes from concave at a paraxial region to convex at a peripheral region. The fifth lens element 350 is made of plastic material and has the object-side surface 351 and the image-side surface 352 being aspheric.

The sixth lens element 360 with negative refractive power has a convex object-side surface 361 and a concave image-side surface 362, wherein the image-side surface 362 of the sixth lens element 360 changes from concave at a paraxial region to convex at a peripheral region. The sixth lens element 360 is made of plastic material and has the object-side surface 361 and the image-side surface 362 being aspheric.

The IR-cut filter 380 is made of glass material, wherein the IR-cut filter 380 is located between the sixth lens element 360 and the image plane 370, and will not affect the focal length of the image system lens assembly.

The detailed optical data of the 3rd embodiment are shown in Table 5 and the aspheric surface data are shown in Table 6 below.

TABLE 5

3rd Embodiment
f = 3.52 mm, Fno = 2.34, HFOV = 38.4 deg.

| Surface # | | Curvature Radius | | Thickness | Material | Index | Abbe # | Focal length |
|---|---|---|---|---|---|---|---|---|
| 0 | Object | Plano | | Infinity | | | | |
| 1 | Lens 1 | 1.623 | (ASP) | 0.177 | Plastic | 1.607 | 26.6 | −6.74 |
| 2 | | 1.114 | (ASP) | 0.212 | | | | |
| 3 | Ape. Stop | Plano | | −0.171 | | | | |
| 4 | Lens 2 | 1.326 | (ASP) | 0.447 | Plastic | 1.544 | 55.9 | 2.27 |
| 5 | | −16.030 | (ASP) | 0.463 | | | | |
| 6 | Lens 3 | −6.164 | (ASP) | 0.241 | Plastic | 1.535 | 56.3 | −51.40 |
| 7 | | −8.055 | (ASP) | 0.178 | | | | |
| 8 | Lens 4 | −1.163 | (ASP) | 0.252 | Plastic | 1.640 | 23.3 | −3.82 |
| 9 | | −2.409 | (ASP) | 0.030 | | | | |
| 10 | Lens 5 | 1.417 | (ASP) | 0.330 | Plastic | 1.535 | 56.3 | 3.83 |
| 11 | | 4.235 | (ASP) | 0.423 | | | | |
| 12 | Lens 6 | 2.036 | (ASP) | 0.878 | Plastic | 1.535 | 56.3 | −21.39 |
| 13 | | 1.468 | (ASP) | 0.450 | | | | |
| 14 | IR-cut filter | Plano | | 0.200 | Glass | 1.517 | 64.2 | — |
| 15 | | Plano | | 0.490 | | | | |
| 16 | Image | Plano | | — | | | | |

Reference wavelength (d-line) is 587.6 nm

TABLE 6

Aspheric Coefficients

| | Surface # | | | | | |
|---|---|---|---|---|---|---|
| | 1 | 2 | 4 | 5 | 6 | 7 |
| k = | −1.4163E+00 | −4.5009E+00 | −2.7391E+00 | 0.0000E+00 | 0.0000E+00 | 3.0000E+00 |
| A4 = | −1.6140E−01 | −1.2151E−01 | −1.9312E−01 | −8.7566E−02 | −3.1547E−01 | −3.6196E−01 |
| A6 = | 3.1903E−01 | 8.2690E−01 | 8.1275E−01 | −8.8219E−01 | 6.1631E−03 | −6.6279E−02 |
| A8 = | −6.3013E−01 | −1.9478E+00 | 1.4678E+00 | 3.6298E−01 | −6.4762E−02 | −3.2802E−02 |
| A10 = | 4.5206E−01 | 1.8907E+00 | 1.2654E+00 | −2.6491E−01 | 2.1395E−01 | 2.8514E−01 |
| A12 = | −1.5453E−01 | −8.2872E−01 | −1.9403E−01 | −3.5171E−01 | 2.9963E−01 | −6.3534E−02 |
| A14 = | | | | 1.1582E+00 | −2.8234E−01 | −6.0641E−02 |

| | Surface # | | | | | |
|---|---|---|---|---|---|---|
| | 8 | 9 | 10 | 11 | 12 | 13 |
| k = | −5.3515E+00 | 4.9833E−01 | −8.6699E+00 | 3.0000E+00 | −1.0270E+01 | −2.9297E+00 |
| A4 = | −3.2128E−01 | −3.1742E−01 | 7.8826E−02 | 1.7557E−01 | −1.9002E−01 | −1.8222E−01 |
| A6 = | 4.8207E−02 | 3.4449E−01 | −1.9025E−01 | −3.8131E−01 | 3.5324E−02 | 9.7623E−02 |
| A8 = | 4.8180E−01 | −2.5932E−02 | 9.2275E−02 | 3.0878E−01 | 1.8523E−02 | −4.2574E−02 |
| A10 = | −6.8166E−01 | −1.2120E−01 | −3.0406E−02 | −1.7157E−01 | −1.0336E−02 | 1.2934E−02 |
| A12 = | 5.4461E−01 | 6.8924E−02 | −9.2850E−04 | 6.0698E−02 | 2.2036E−03 | −2.4524E−03 |
| A14 = | −1.7112E−01 | 7.5956E−03 | 2.3757E−03 | −1.1501E−02 | −2.3069E−04 | 2.5592E−04 |
| A16 = | | | | 8.6055E−04 | 9.7129E−06 | −1.1161E−05 |

In the image system lens assembly according to the 3rd embodiment, the definitions of f, Fno, HFOV, V4, V5, R11, R12, f1, f2, ΣCT, Td, TTL, and ImgH are the same as those stated in the 1st embodiment with corresponding values for the 3rd embodiment. Moreover, these parameters can be calculated from Table 5 and Table 6 as the following values and satisfy the following relationships:

| | | | |
|---|---|---|---|
| f (mm) | 3.52 | f/f1 | −0.52 |
| Fno | 2.34 | f/f2 | 1.55 |
| HFOV (deg.) | 38.4 | ΣCT/Td | 0.67 |
| V4/V5 | 0.41 | f/tan(HFOV) (mm) | 4.45 |
| (R11 − R12)/(R11 + R12) | 0.16 | TTL/ImgH | 1.59 |

4th Embodiment

Figure 7:
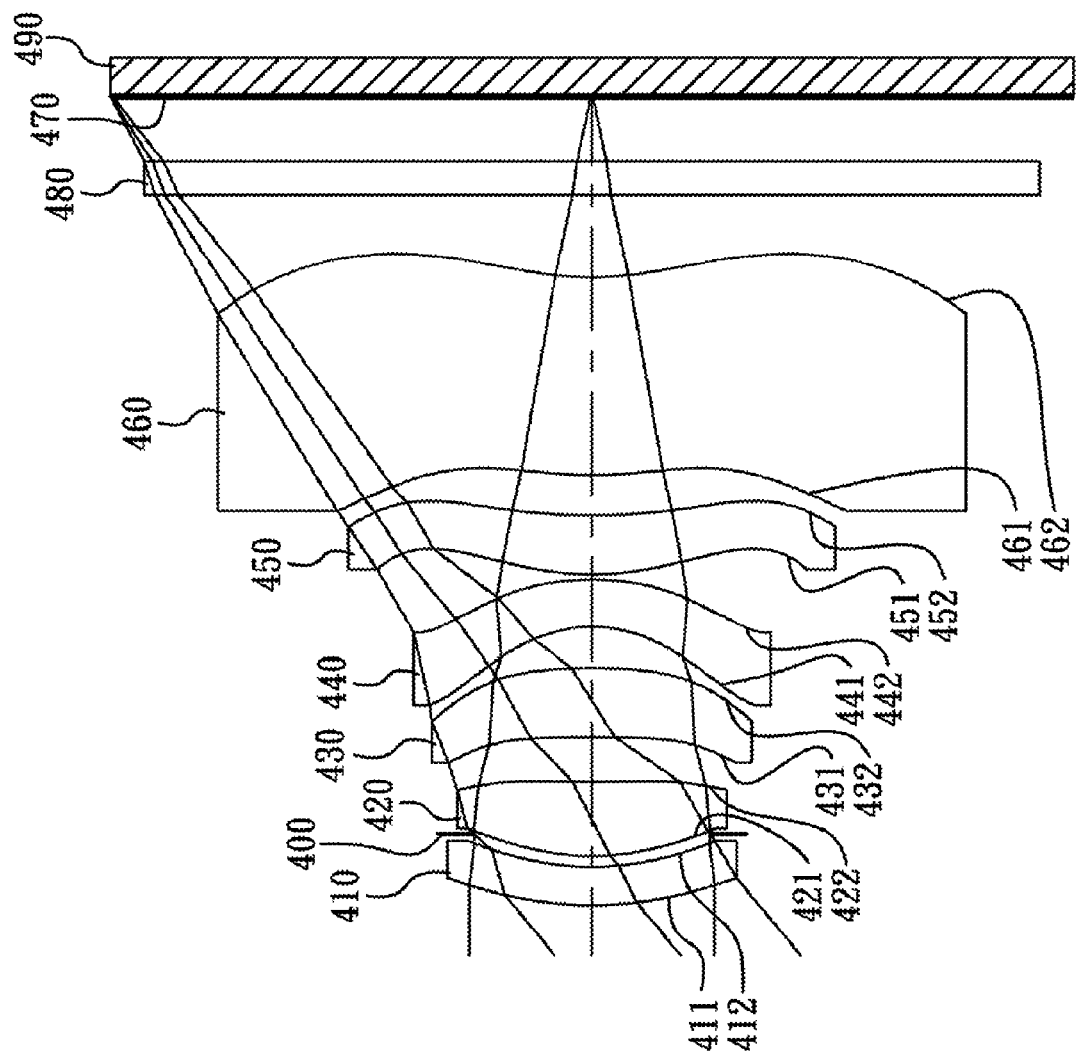
FIG. 7 is a schematic view of an image system lens assembly according to the 4th embodiment of the present disclosure.
Figure 8:
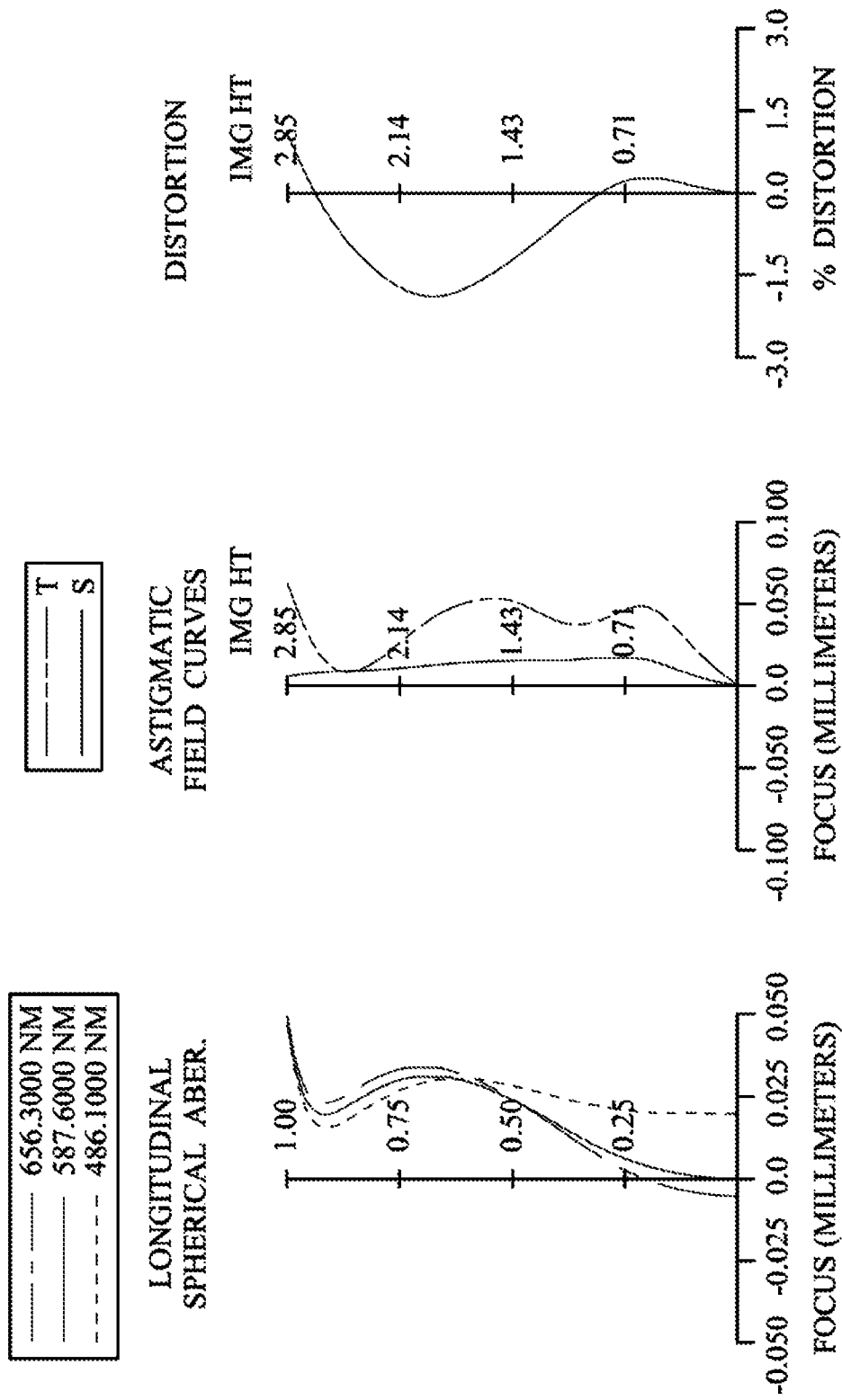
FIG. 8 shows spherical aberration curves, astigmatic field curves and a distortion curve of the image system lens assembly according to the 4th embodiment.

FIG. 7 is a schematic view of an image system lens assembly according to the 4th embodiment of the present disclosure. FIG. 8 shows spherical aberration curves, astigmatic field curves and a distortion curve of the image system lens assembly according to the 4th embodiment. In FIG. 7, the image system lens assembly includes, in order from an object side to an image side, a first lens element 410, an aperture stop 400, a second lens element 420, a third lens element 430, a fourth lens element 440, a fifth lens element 450, a sixth lens element 460, an IR-cut filter 480, an image plane 470, and an image sensor 490.

The first lens element 410 with negative refractive power has a convex object-side surface 411 and a concave image-side surface 412. The first lens element 410 is made of plastic material and has the object-side surface 411 and the image-side surface 412 being aspheric.

The second lens element 420 with positive refractive power has a convex object-side surface 421 and a concave image-side surface 422. The second lens element 420 is made of plastic material and has the object-side surface 421 and the image-side surface 422 being aspheric.

The third lens element 430 with positive refractive power has a concave object-side surface 431 and a convex image-side surface 432. The third lens element 430 is made of plastic material and has the object-side surface 431 and the image-side surface 432 being aspheric.

The fourth lens element 440 with negative refractive power has a concave object-side surface 441 and a convex image-side surface 442. The fourth lens element 440 is made of plastic material and has the object-side surface 441 and the image-side surface 442 being aspheric.

The fifth lens element 450 with positive refractive power has a convex object-side surface 451 and a concave image-side surface 452, wherein the object-side surface 451 of the fifth lens element 450 changes from convex at a paraxial region to concave at a peripheral region, and the image-side surface 452 of the fifth lens element 450 changes from concave at a paraxial region to convex at a peripheral region. The fifth lens element 450 is made of plastic material and has the object-side surface 451 and the image-side surface 452 being aspheric.

The sixth lens element 460 with negative refractive power has a convex object-side surface 461 and a concave image-side surface 462, wherein the image-side surface 462 of the sixth lens element 460 changes from concave at a paraxial region to convex at a peripheral region. The sixth lens element 460 is made of plastic material and has the object-side surface 461 and the image-side surface 462 being aspheric.

The IR-cut filter 480 is made of glass material, wherein the IR-cut filter 480 is located between the sixth lens element 460 and the image plane 470, and will not affect the focal length of the image system lens assembly.

The detailed optical data of the 4th embodiment are shown in Table 7 and the aspheric surface data are shown in Table 8 below.

TABLE 7

4th Embodiment
f = 3.42 mm, Fno = 2.35, HFOV = 39.4 deg.

| Surface # | | Curvature Radius | Thickness | Material | Index | Abbe # | Focal length |
|---|---|---|---|---|---|---|---|
| 0 | Object | Plano | Infinity | | | | |
| 1 | Lens 1 | 2.095 (ASP) | 0.227 | Plastic | 1.633 | 23.4 | −8.67 |
| 2 | | 1.453 (ASP) | 0.195 | | | | |
| 3 | Ape. Stop | Plano | −0.131 | | | | |
| 4 | Lens 2 | 1.296 (ASP) | 0.441 | Plastic | 1.544 | 55.9 | 2.64 |
| 5 | | 11.560 (ASP) | 0.260 | | | | |
| 6 | Lens 3 | −27.789 (ASP) | 0.412 | Plastic | 1.544 | 55.9 | 7.80 |
| 7 | | −3.699 (ASP) | 0.244 | | | | |
| 8 | Lens 4 | −0.802 (ASP) | 0.284 | Plastic | 1.634 | 23.8 | −2.68 |
| 9 | | −1.725 (ASP) | 0.030 | | | | |
| 10 | Lens 5 | 1.609 (ASP) | 0.350 | Plastic | 1.544 | 55.9 | 4.16 |
| 11 | | 5.126 (ASP) | 0.239 | | | | |
| 12 | Lens 6 | 2.289 (ASP) | 1.170 | Plastic | 1.544 | 55.9 | −130.32 |
| 13 | | 1.818 (ASP) | 0.492 | | | | |
| 14 | IR-cut filter | Plano | 0.200 | Glass | 1.517 | 64.2 | — |
| 15 | | Plano | 0.382 | | | | |
| 16 | Image | Plano | — | | | | |

Reference wavelength (d-line) is 587.6 nm

TABLE 8

Aspheric Coefficients

| | Surface # | | | | | |
|---|---|---|---|---|---|---|
| | 1 | 2 | 4 | 5 | 6 | 7 |
| k = | 9.5070E−01 | −8.6503E+00 | −5.1197E+00 | 0.0000E+00 | 0.0000E+00 | −1.0237E+01 |
| A4 = | −1.1293E−01 | −1.2445E−01 | −1.7413E−01 | −1.8964E−01 | −2.5660E−01 | −2.6110E−01 |
| A6 = | 2.8449E−01 | 9.4021E−01 | 7.9717E−01 | −1.2160E−01 | −8.5578E−02 | −9.5160E−02 |
| A8 = | −4.6548E−01 | −1.9379E+00 | −1.6134E+00 | 2.8510E−01 | −1.6372E−01 | −2.1757E−02 |
| A10 = | 3.6510E−01 | 2.0158E+00 | 1.5677E+00 | −3.3838E−01 | 3.6027E−01 | 2.6441E−01 |
| A12 = | −1.5706E−01 | −7.8278E−01 | −4.4901E−01 | −1.0314E−01 | 2.4226E−01 | −9.4393E−02 |
| A14 = | | | | 6.5730E−01 | −3.0268E−01 | −4.5524E−02 |

| | Surface # | | | | | |
|---|---|---|---|---|---|---|
| | 8 | 9 | 10 | 11 | 12 | 13 |
| k = | −2.5822E+00 | −6.5846E−02 | −9.7922E+00 | 3.0000E+00 | −2.0000E+01 | −2.3875E+00 |
| A4 = | −3.3405E−01 | −2.8652E−01 | 7.8826E−02 | 1.7557E−01 | −1.9002E−01 | −1.8222E−01 |
| A6 = | 1.3688E−01 | 3.2868E−01 | −1.9025E−01 | −3.8131E−01 | 3.5324E−02 | 9.7623E−02 |
| A8 = | 4.9723E−01 | 1.2654E−02 | 9.2275E−02 | 3.0878E−01 | 1.8523E−02 | −4.2574E−02 |
| A10 = | −6.8533E−01 | −1.1047E−01 | −3.0406E−02 | −1.7157E−01 | −1.0336E−02 | 1.2934E−02 |
| A12 = | 5.3047E−01 | 4.3996E−02 | −9.2850E−04 | 6.0698E−02 | 2.2036E−03 | −2.4524E−03 |
| A14 = | −1.8280E−01 | 1.3740E−02 | 2.3757E−03 | −1.1501E−02 | −2.3069E−04 | 2.5592E−04 |
| A16 = | | | | 8.6055E−04 | 9.7129E−06 | −1.1161E−05 |

In the image system lens assembly according to the 4th embodiment, the definitions of f, Fno, HFOV, V4, V5, R11, R12, f1, f2, ΣCT, Td, TTL, and ImgH are the same as those stated in the 1st embodiment with corresponding values for the 4th embodiment. Moreover, these parameters can be calculated from Table 7 and Table 8 as the following values and satisfy the following relationships:

| | | | |
|---|---|---|---|
| f (mm) | 3.42 | f/f1 | −0.39 |
| Fno | 2.35 | f/f2 | 1.29 |
| HFOV (deg.) | 39.4 | ΣCT/Td | 0.78 |
| V4/V5 | 0.43 | f/tan(HFOV) (mm) | 4.16 |
| (R11 − R12)/(R11 + R12) | 0.11 | TTL/ImgH | 1.66 |

5th Embodiment

Figure 9:
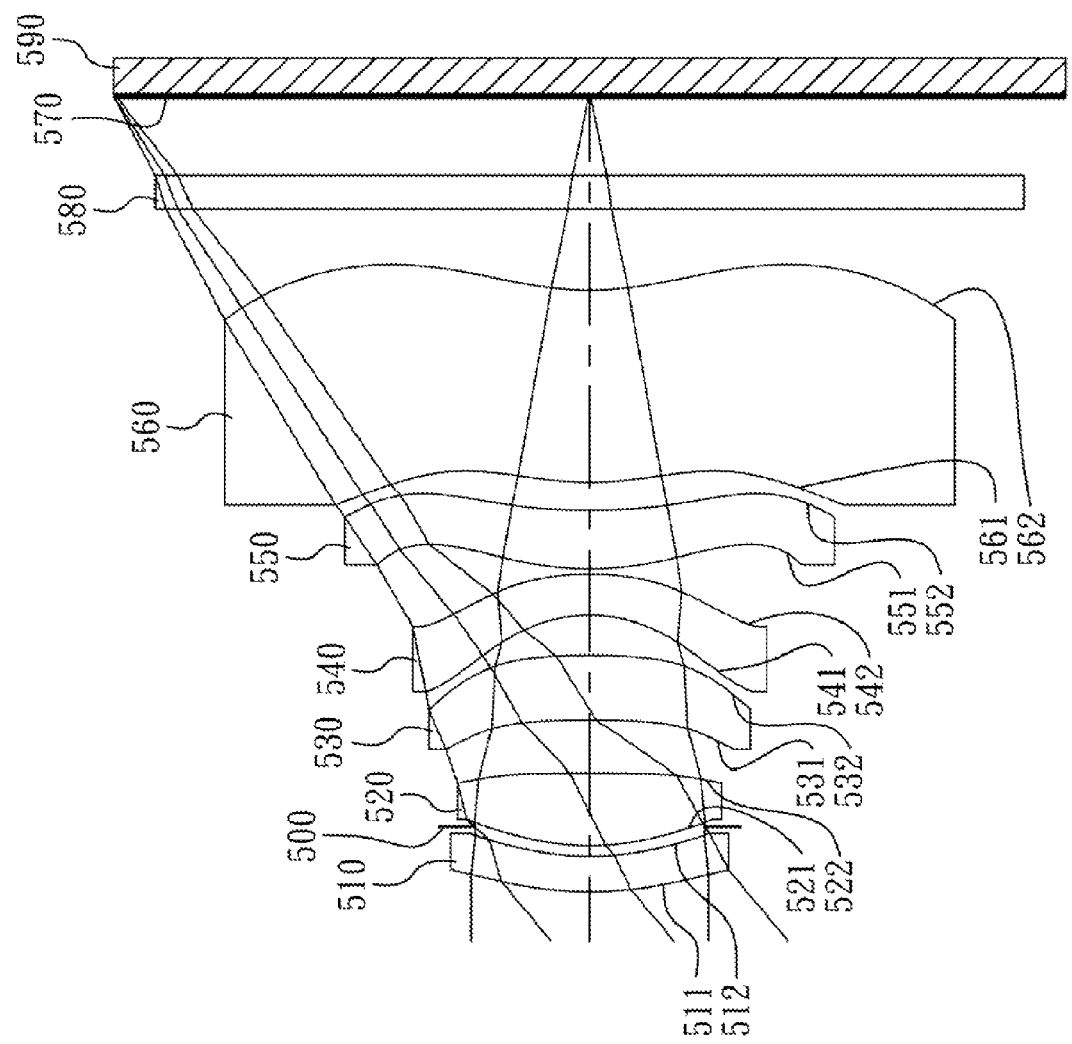
FIG. 9 is a schematic view of an image system lens assembly according to the 5th embodiment of the present disclosure.
Figure 10:
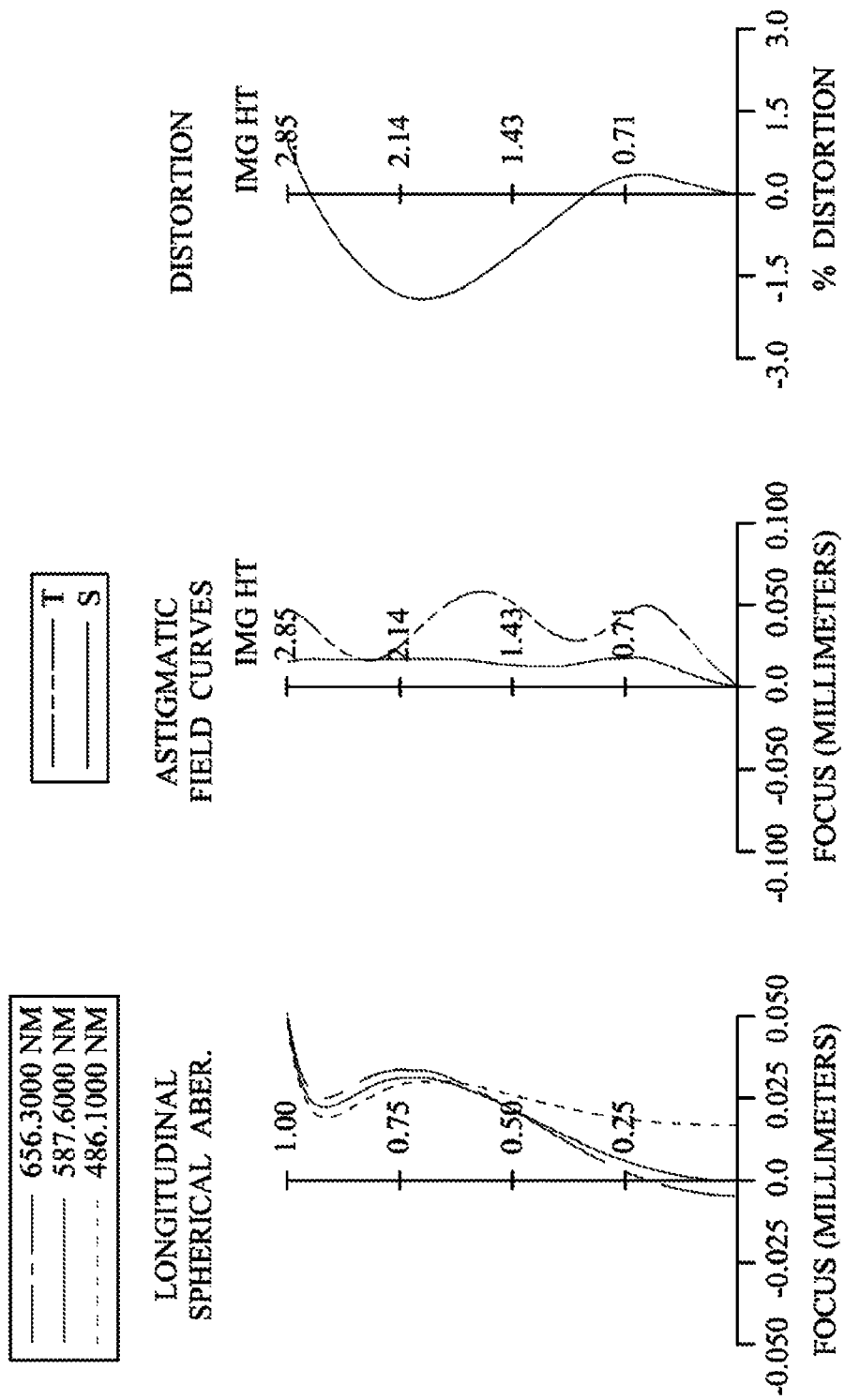
FIG. 10 shows spherical aberration curves, astigmatic field curves and a distortion curare of the image system lens assembly according to the 5th embodiment.

FIG. 9 is a schematic view of an image system lens assembly according to the 5th embodiment of the present disclosure. FIG. 10 shows spherical aberration curves, astigmatic field curves and a distortion curve of the image system lens assembly according to the 5th embodiment. In FIG. 9, the image system lens assembly includes, in order from an object side to an image side, a first lens element 510, an aperture stop 500, a second lens element 520, a third lens element 530, a fourth lens element 540, a fifth lens element 550, a sixth lens element 560, an IR-cut filter 580, an image plane 570 and an image sensor 590.

The first lens element 510 with negative refractive power has a convex object-side surface 511 and a concave image-side surface 512. The first lens element 510 is made of plastic material and has the object-side surface 511 and the image-side surface 512 being aspheric.

The second lens element 520 with positive refractive power has a convex object-side surface 521 and a convex image-side surface 522. The second lens element 520 is made of plastic material and has the object-side surface 521 and the image-side surface 522 being aspheric.

The third lens element 530 with positive refractive power has a concave object-side surface 531 and a convex image-side surface 532. The third lens element 530 is made of plastic material and has the object-side surface 531 and the image-side surface 532 being aspheric.

The fourth lens element 540 with negative refractive power has a concave object-side surface 541 and a convex image-side surface 542. The fourth lens element 540 is made of plastic material and has the object-side surface 541 and the image-side surface 542 being aspheric.

The fifth lens element 550 with positive refractive power has a convex object-side surface 551 and a concave image-side surface 552, wherein the object-side surface 551 of the fifth lens element 550 changes from convex at a paraxial region to concave at a peripheral region, and the image-side surface 552 of the fifth lens element 550 changes from concave at a paraxial region to convex at a peripheral region. The fifth lens element 550 is made of plastic material and has the object-side surface 551 and the image-side surface 552 being aspheric.

The sixth lens element 560 with positive refractive power has a convex object-side surface 561 and a concave image-side surface 562, wherein the image-side surface 562 of the sixth lens element 560 changes from concave at a paraxial region to convex at a peripheral region. The sixth lens element 560 is made of plastic material and has the object-side surface 561 and the image-side surface 562 being aspheric.

The IR-cut filter 580 is made of glass material, wherein the IR-cut filter 580 is located between the sixth lens element 560 and the image plane 570, and will not affect the focal length of the image system lens assembly.

The detailed optical data of the 5th embodiment are shown in Table 9 and the aspheric surface data are shown in Table 10 below.

TABLE 9

5th Embodiment
f = 3.41 mm, Fno = 2.40, HFOV = 39.5 deg.

| Surface # |  | Curvature Radius | Thickness | Material | Index | Abbe # | Focal length |
|---|---|---|---|---|---|---|---|
| 0 | Object | Plano | Infinity | | | | |
| 1 | Lens 1 | 2.146 (ASP) | 0.212 | Plastic | 1.640 | 23.3 | −9.28 |
| 2 | | 1.515 (ASP) | 0.180 | | | | |
| 3 | Ape. Stop | Plano | −0.116 | | | | |
| 4 | Lens 2 | 1.405 (ASP) | 0.435 | Plastic | 1.544 | 55.9 | 2.54 |
| 5 | | −80.173 (ASP) | 0.319 | | | | |
| 6 | Lens 3 | −8.811 (ASP) | 0.389 | Plastic | 1.544 | 55.9 | 17.11 |
| 7 | | −4.597 (ASP) | 0.238 | | | | |
| 8 | Lens 4 | −0.851 (ASP) | 0.250 | Plastic | 1.640 | 23.3 | −2.91 |
| 9 | | −1.745 (ASP) | 0.030 | | | | |
| 10 | Lens 5 | 1.792 (ASP) | 0.350 | Plastic | 1.544 | 55.9 | 5.26 |
| 11 | | 4.466 (ASP) | 0.169 | | | | |
| 12 | Lens 6 | 1.702 (ASP) | 1.150 | Plastic | 1.544 | 55.9 | 12.63 |
| 13 | | 1.724 (ASP) | 0.492 | | | | |
| 14 | IR-cut filter | Plano | 0.200 | Glass | 1.517 | 64.2 | — |
| 15 | | Plano | 0.474 | | | | |
| 16 | Image | Plano | — | | | | |

Reference wavelength (d-line) is 587.6 nm

TABLE 10

Aspheric Coefficients

| Surface # | | | | | | |
|---|---|---|---|---|---|---|
| | 1 | 2 | 4 | 5 | 6 | 7 |
| k = | 4.6773E−01 | −7.6158E+00 | −4.2382E+00 | −1.4083E+00 | −1.1310E+00 | −6.7985E+00 |
| A4 = | −1.2665E−01 | −1.3674E−01 | −1.7794E−01 | −1.7013E−01 | −2.8012E−01 | −2.6845E−01 |
| A6 = | 2.8340E−01 | 8.7880E−01 | 7.6429E−01 | −4.1169E−02 | −6.8685E−02 | −1.3804E−01 |
| A8 = | −5.2068E−01 | −1.9359E+00 | −1.5854E+00 | 1.4993E−01 | −3.8100E−02 | 3.3581E−02 |
| A10 = | 4.0014E−01 | 2.0133E+00 | 1.5983E+00 | −2.0069E−01 | 2.4340E−01 | 2.4922E−01 |
| A12 = | −1.5759E−01 | −7.8813E−01 | −4.5180E−01 | −9.2114E−02 | 2.4830E−01 | −9.5127E−02 |
| A14 = | | | | 6.4017E−01 | −3.1858E−01 | −4.4062E−02 |

| Surface # | | | | | | |
|---|---|---|---|---|---|---|
| | 8 | 9 | 10 | 11 | 12 | 13 |
| k = | −2.8534E+00 | 1.3718E−01 | −8.7808E+00 | 2.9953E+00 | −1.1642E+01 | −2.4477E+00 |
| A4 = | −3.4035E−01 | −2.9922E−01 | 7.8826E−02 | 1.7557E−01 | −1.9002E−01 | −1.8222E−01 |
| A6 = | 1.0709E−01 | 3.4277E−01 | −1.9025E−01 | −3.8131E−01 | 3.5324E−02 | 9.7623E−02 |
| A8 = | 4.9964E−01 | 1.6235E−02 | 9.2275E−02 | 3.0878E−01 | 1.8523E−02 | −4.2574E−02 |

TABLE 10-continued

Aspheric Coefficients

| A10 = | −6.6882E−01 | −1.1904E−01 | −3.0406E−02 | −1.7157E−01 | −1.0336E−02 | 1.2934E−02 |
|---|---|---|---|---|---|---|
| A12 = | 5.3360E−01 | 4.6393E−02 | −9.2850E−04 | 6.0698E−02 | 2.2036E−03 | −2.4524E−03 |
| A14 = | −1.8356E−01 | 1.4629E−02 | 2.3757E−03 | −1.1501E−02 | −2.3069E−04 | 2.5592E−04 |
| A16 = | | | | 8.6055E−04 | 9.7129E−06 | −1.1161E−05 |

In the image system lens assembly according to the 5th embodiment, the definitions of f, Fno, HFOV, V4, V5, R11, R12, f1, f2, ΣCT, Td, TTL, and ImgH are the same as those stated in the 1st embodiment with corresponding values for the 5th embodiment. Moreover, these parameters can be calculated from Table 9 and Table 10 as the following values and satisfy the following relationships:

| f (mm) | 3.41 | f/f1 | −0.37 |
|---|---|---|---|
| Fno | 2.40 | f/f2 | 1.29 |
| HFOV (deg.) | 39.5 | ΣCT/Td | 0.18 |
| V4/V5 | 0.42 | f/tan(HFOV) [mm] | 4.16 |
| (R11 − R12)/(R11 + R12) | −0.01 | TTL/ImgH | 1.65 |

6th Embodiment

Figure 11:
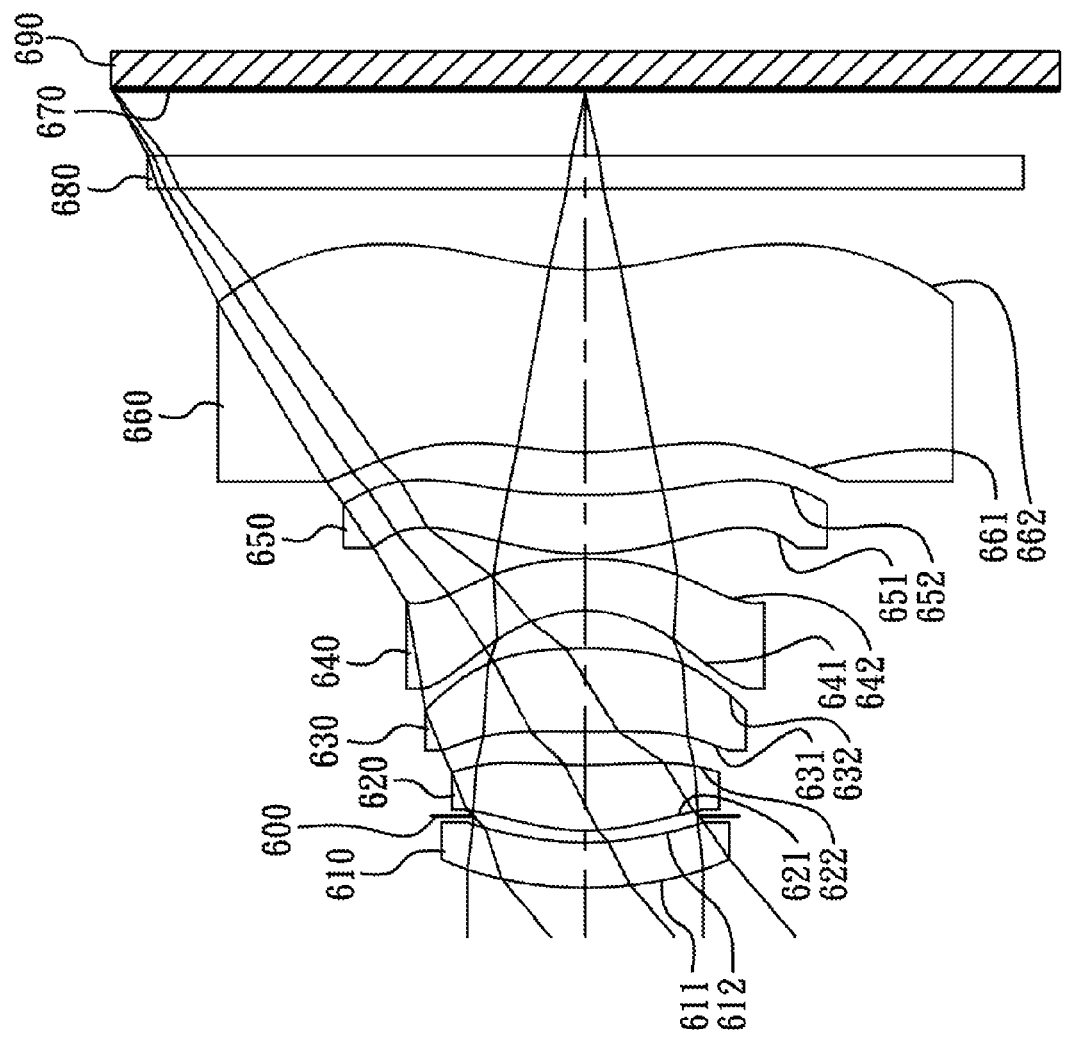
FIG. 11 is a schematic view of an image system lens assembly according to the 6th embodiment of the present disclosure.
Figure 12:
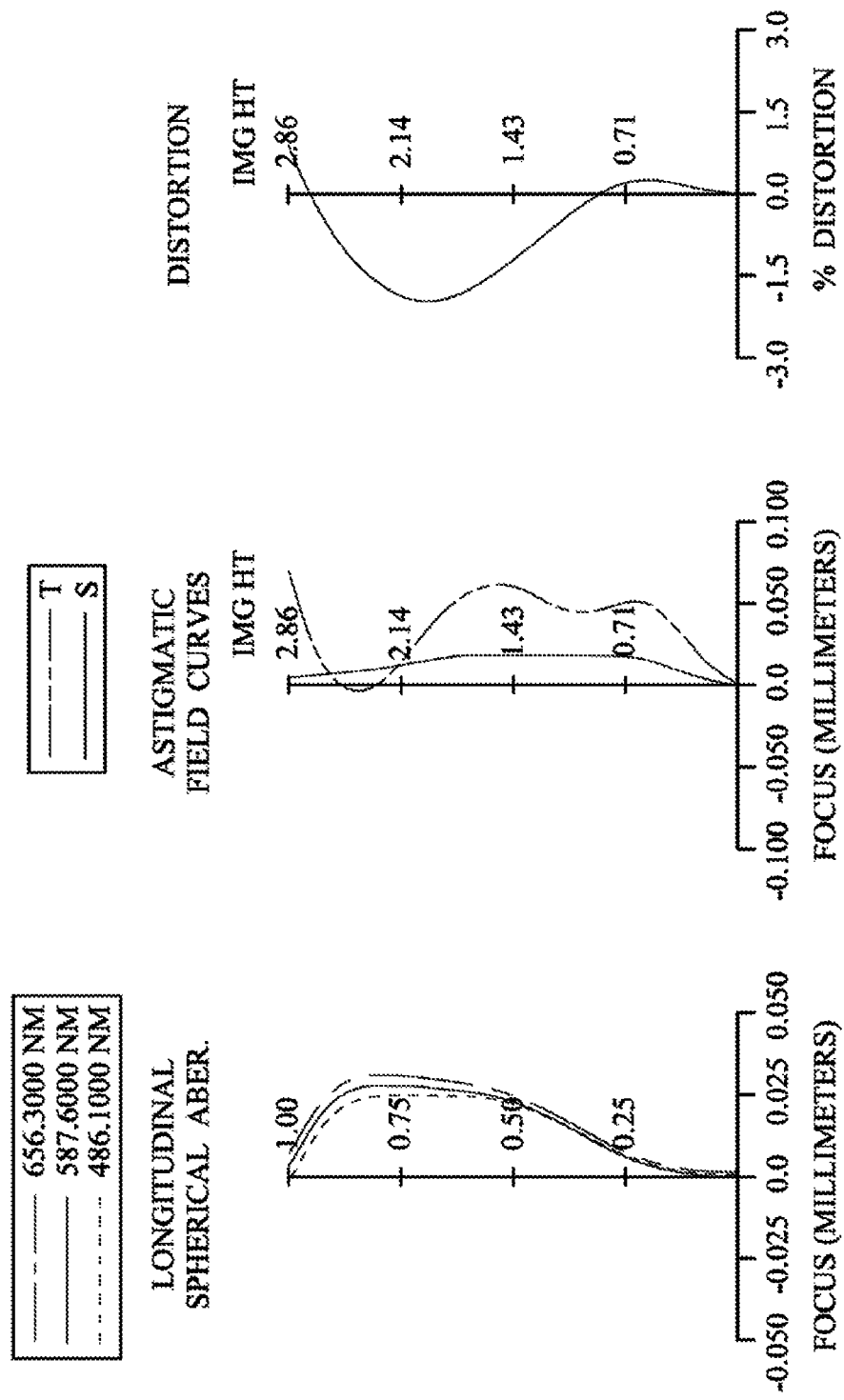
FIG. 12 shows spherical aberration curves, astigmatic field curves and a distortion curve of the image system lens assembly according to the 6th embodiment.

FIG. 11 is a schematic view of an image system lens assembly according to the 6th embodiment of the present disclosure. FIG. 12 shows spherical aberration curves, astigmatic field curves and a distortion curve of the image system lens assembly according to the 6th embodiment. In FIG. 11, the image system lens assembly includes, in order from an object side to an image side, a first lens element 610, an aperture stop 600, a second lens element 620, a third lens element 630, a fourth lens element 640, a fifth lens element 650, a sixth lens element 660, an IR-cut filter 680, an image plane 670 and an image sensor 690.

The first lens element 610 with negative refractive power has a convex object-side surface 611 and a concave image-side surface 612. The first lens element 610 is made of glass material and has the object-side surface 611 and the image-side surface 612 being aspheric.

The second lens element 620 with positive refractive power has a convex object-side surface 621 and a concave image-side surface 622. The second lens element 620 is made of plastic material and has the object-side surface 621 and the image-side surface 622 being aspheric.

The third lens element 630 with positive refractive power has a convex object-side surface 631 and a convex image-side surface 632. The third lens element 630 is made of plastic material and has the object-side surface 631 and the image-side surface 632 being aspheric.

The fourth lens element 640 with negative refractive power has a concave object-side surface 641 and a convex image-side surface 642. The fourth lens element 640 is made of plastic material and has the object-side surface 641 and the image-side surface 642 being aspheric.

The fifth lens element 650 with positive refractive power has a convex object-side surface 651 and a concave image-side surface 652, wherein the object-side surface 651 of the fifth lens element 650 changes from convex at a paraxial region to concave at a peripheral region, and the image-side surface 652 of the fifth lens element 650 changes from concave at a paraxial region to convex at a peripheral region. The fifth lens element 650 is made of plastic material and has the object-side surface 661 and the image-side surface 652 being aspheric.

The sixth lens element 660 with positive refractive power has a convex object-side surface 661 and a concave image-side surface 662, wherein the image-side surface 662 of the sixth lens element 660 changes from concave at a paraxial region to convex at a peripheral region. The sixth lens element 660 is made of plastic material and has the object-side surface 661 and the image-side surface 662 being aspheric.

The IR-cut filter 680 is made of glass material, wherein the IR-cut filter 680 is located between the sixth lens element 660 and the image plane 670, and will not affect the focal length of the image system lens assembly.

The detailed optical data of the 6th embodiment are shown in Table 11 and the aspheric surface data are shown in Table 12 below.

TABLE 11

6th Embodiment
f = 3.34 mm, Fno = 2.35, HFOV = 40.1 deg.

| Surface # | | Curvature Radius | | Thickness | Material | Index | Abbe # | Focal length |
|---|---|---|---|---|---|---|---|---|
| 0 | Object | Plano | | Infinity | | | | |
| 1 | Lens 1 | 2.348 | (ASP) | 0.271 | Glass | 1.566 | 61.1 | −8.97 |
| 2 | | 1.538 | (ASP) | 0.161 | | | | |
| 3 | Ape. Stop | Plano | | −0.088 | | | | |
| 4 | Lens 2 | 1.213 | (ASP) | 0.395 | Plastic | 1.544 | 55.9 | 2.97 |
| 5 | | 4.286 | (ASP) | 0.197 | | | | |
| 6 | Lens 3 | 27.942 | (ASP) | 0.504 | Plastic | 1.544 | 55.9 | 4.67 |
| 7 | | −2.776 | (ASP) | 0.225 | | | | |
| 8 | Lens 4 | −0.805 | (ASP) | 0.317 | Plastic | 1.634 | 23.8 | −2.44 |
| 9 | | −1.937 | (ASP) | 0.030 | | | | |
| 10 | Lens 5 | 1.616 | (ASP) | 0.350 | Plastic | 1.544 | 55.9 | 4.33 |
| 11 | | 4.746 | (ASP) | 0.261 | | | | |
| 12 | Lens 6 | 1.984 | (ASP) | 1.094 | Plastic | 1.530 | 55.8 | 94.29 |
| 13 | | 1.671 | (ASP) | 0.492 | | | | |

TABLE 11-continued

6th Embodiment
f = 3.34 mm, Fno = 2.35, HFOV = 40.1 deg.

| Surface # | | Curvature Radius | Thickness | Material | Index | Abbe # | Focal length |
|---|---|---|---|---|---|---|---|
| 14 | IR-cut filter | Plano | 0.200 | Glass | 1.517 | 64.2 | — |
| 15 | | Plano | 0.395 | | | | |
| 16 | Image | Plano | — | | | | |

Reference wavelength (d-line) is 587.6 nm

TABLE 12

Aspheric Coefficients

| Surface # | | | | | |
|---|---|---|---|---|---|
| 1 | 2 | 4 | 5 | 6 | 7 |
| k = 1.7154E+00 | −1.4329E+01 | −6.4793E+00 | −8.5339E+00 | 3.0000E+00 | −1.0262E+01 |
| A4 = −1.0363E−01 | −1.7215E−01 | −2.2472E−01 | −2.3906E−01 | −2.0831E−01 | −2.7040E−01 |
| A6 = 3.2288E−01 | 9.5846E−01 | 7.3202E−01 | −2.2783E−01 | −1.5216E−01 | −1.3832E−01 |
| A8 = −4.9408E−01 | −1.8664E+00 | −1.6268E+00 | 3.6413E−01 | −1.8549E−01 | −2.6490E−02 |
| A10 = 4.2560E−01 | 1.9931E+00 | 1.4838E+00 | −3.7887E−01 | 4.6155E−01 | 3.0963E−01 |
| A12 = −1.5726E−01 | −7.8278E−01 | −4.4901E−01 | −1.0314E−01 | 2.4322E−01 | −9.3793E−02 |
| A14 = | | | 6.5730E−01 | −3.0268E−01 | −4.5876E−02 |

| Surface # | | | | | |
|---|---|---|---|---|---|
| 9 | 9 | 10 | 11 | 12 | 13 |
| k = −2.4866E+00 | −1.6398E−01 | −9.2136E+00 | 3.0000E+00 | −1.2950E+01 | −2.5869E+00 |
| A4 = −3.5495E−01 | −2.8593E−01 | 7.8826E−02 | 1.7557E−01 | −1.9002E−01 | −1.8222E−01 |
| A6 = 1.4097E−01 | 3.3814E−01 | −1.9025E−01 | −3.8131E−01 | 3.5324E−02 | 9.7623E−02 |
| A8 = 5.3469E−01 | 1.4654E−02 | 9.2275E−02 | 3.0878E−01 | 1.8523E−02 | −4.2574E−02 |
| A10 = −6.9905E−01 | −1.1445E−01 | −3.0406E−02 | −1.7157E−01 | −1.0336E−02 | 1.2934E−02 |
| A12 = 5.3051E−01 | 4.0918E−02 | −9.2850E−04 | 6.0698E−02 | 2.2036E−03 | −2.4524E−03 |
| A14 = −1.8315E−01 | 9.9301E−03 | 2.3757E−03 | −1.1501E−02 | −2.3069E−04 | 2.5592E−04 |
| A16 = | | | 8.6055E−04 | 9.7129E−06 | −1.1161E−05 |

In the image system lens assembly according to the 6th embodiment, the definitions of f, Fno, HFOV, V4, V5, R11, R12, f1, f2, ΣCT, Td, TTL, and ImgH are the same as those stated in the 1st embodiment with corresponding values for the 6th embodiment. Moreover, these parameters can be calculated from Table 11 and Table 12 as the following values and satisfy the following relationships:

| f (mm) | 3.34 | f/f1 | −0.37 |
|---|---|---|---|
| Fno | 2.35 | f/f2 | 1.12 |
| HFOV (deg.) | 40.1 | ΣCT/Td | 0.79 |
| V4/V5 | 0.43 | f/tan(HFOV) (mm) | 3.97 |
| (R11 − R12)/(R11 + R12) | 0.09 | TTL/ImgH | 1.66 |

7th Embodiment

Figure 13:
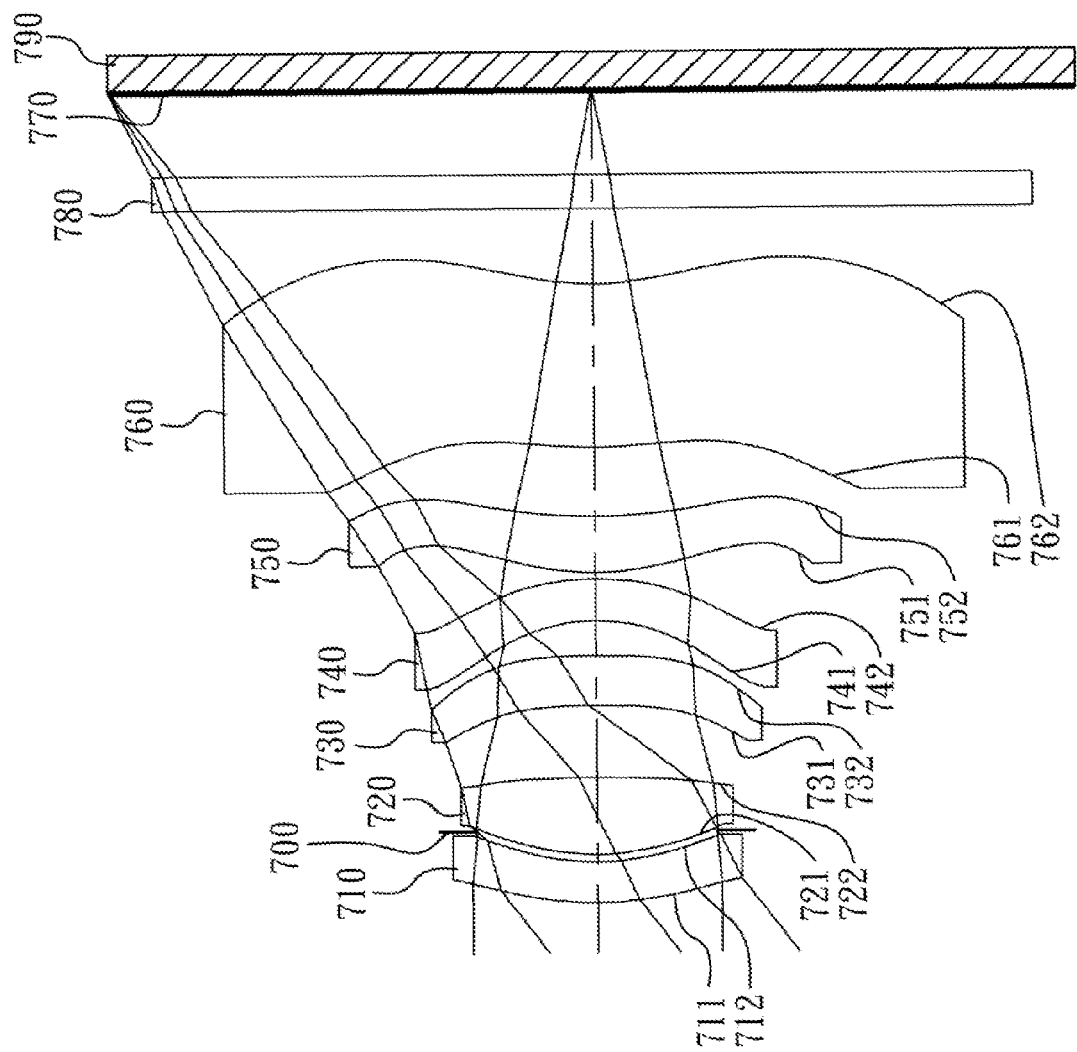
FIG. 13 is a schematic view of an image system lens assembly according to the 7th embodiment of the present disclosure.
Figure 14:
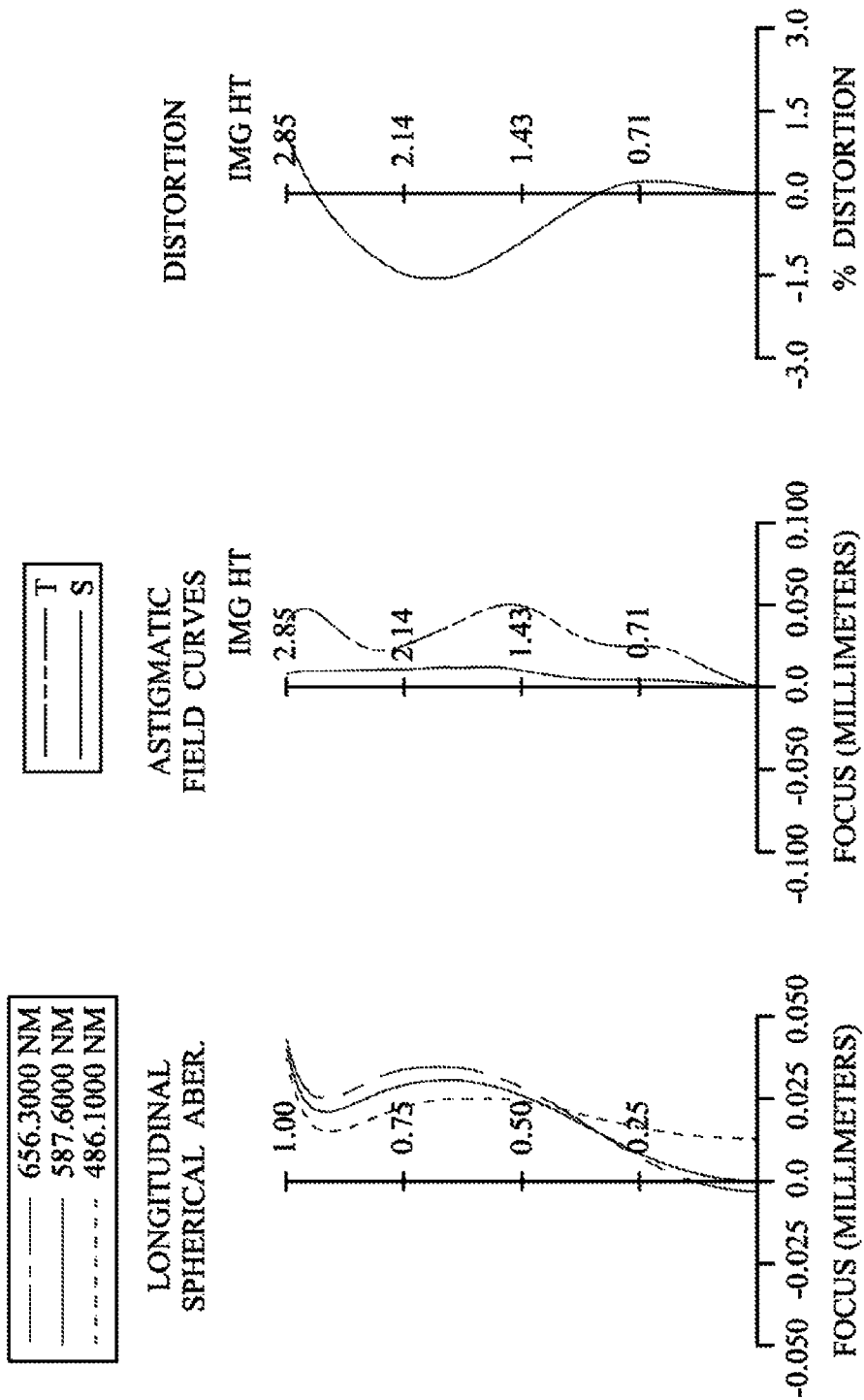
FIG. 14 shows spherical aberration curves, astigmatic field curves and a distortion curve of the image system lens assembly according to the 7th embodiment.

FIG. 13 is a schematic view of an image system lens assembly according to the 7th embodiment of the present disclosure. FIG. 14 shows spherical aberration curves, astigmatic field curves and a distortion curve of the image system lens assembly according to the 7th embodiment. In FIG. 13, the image system lens assembly includes, in order from an object side to an image side, a first lens element 710, an aperture stop 700, a second lens element 720, a third lens element 730, a fourth lens element 740, a fifth lens element 750, a sixth lens element 760, an IR-cut filter 780, an image plane 770 and an image sensor 790.

The first lens element 710 with negative refractive power has a convex object-side surface 711 and a concave image-side surface 712. The first lens element 710 is made of plastic material and has the object-side surface 711 and the image-side surface 712 being aspheric.

The second lens element 720 with positive refractive power has a convex object-side surface 721 and a convex image-side surface 722. The second lens element 720 is made of plastic material and has the object-side surface 721 and the image-side surface 722 being aspheric.

The third lens element 730 with negative refractive power has a concave object-side surface 731 and a convex image-side surface 732. The third lens element 730 is made of plastic material and has the object-side surface 731 and the image-side surface 732 being aspheric.

The fourth lens element 740 with negative refractive power has a concave object-side surface 741 and a convex image-side surface 742. The fourth lens element 740 is made of plastic material and has the object-side surface 741 and the image-side surface 742 being aspheric.

The fifth lens element 750 with positive refractive power has a convex object-side surface 751 and a concave image-side surface 752, wherein the object-side surface 751 of the fifth lens element 750 changes from convex at a paraxial region to concave at a peripheral region, and the image-side surface 752 of the fifth lens element 750 changes from concave at a paraxial region to convex at a peripheral region. The fifth lens element 750 is made of plastic material and has the object-side surface 751 and the image-side surface 752 being aspheric.

The sixth lens element 760 with negative refractive power has a convex object-side surface 761 and a concave image-side surface 762, wherein the image-side surface 762 of the sixth lens element 760 changes from concave at a paraxial region to convex at a peripheral region. The sixth lens element 760 is made of plastic material and has the object-side surface 761 and the image-side surface 762 being aspheric.

The IR-cut filter 780 is made of glass material, wherein the IR-cut filter 780 is located between the sixth lens element 760 and the image plane 770, and will not affect the focal length of the image system lens assembly.

The detailed optical data of the 7th embodiment are shown in Table 13 and the aspheric surface data are shown in Table 14 below.

TABLE 13

7th Embodiment
f = 3.68 mm, Fno = 2.50, HFOV = 37.4 deg.

| Surface # | | Curvature Radius | Thickness | Material | Index | Abbe # | Focal length |
|---|---|---|---|---|---|---|---|
| 0 | Object | Plano | Infinity | | | | |
| 1 | Lens 1 | 1.993 (ASP) | 0.241 | Plastic | 1.640 | 23.3 | −7.29 |
| 2 | | 1.330 (ASP) | 0.184 | | | | |
| 3 | Ape. Stop | Plano | −0.139 | | | | |
| 4 | Lens 2 | 1.366 (ASP) | 0.453 | Plastic | 1.544 | 55.9 | 2.33 |
| 5 | | −15.180 (ASP) | 0.427 | | | | |
| 6 | Lens 3 | −5.603 (ASP) | 0.294 | Plastic | 1.544 | 55.9 | −59.03 |
| 7 | | −6.912 (ASP) | 0.203 | | | | |
| 8 | Lens 4 | −1.079 (ASP) | 0.250 | Plastic | 1.640 | 23.3 | −4.70 |
| 9 | | −1.834 (ASP) | 0.039 | | | | |
| 10 | Lens 5 | 1.577 (ASP) | 0.330 | Plastic | 1.544 | 55.9 | 4.39 |
| 11 | | 4.294 (ASP) | 0.411 | | | | |
| 12 | Lens 6 | 2.705 (ASP) | 0.962 | Plastic | 1.535 | 56.3 | −11.64 |
| 13 | | 1.652 (ASP) | 0.450 | | | | |
| 14 | IR-cut filter | Plano | 0.200 | Glass | 1.517 | 64.2 | — |
| 15 | | Plano | 0.495 | | | | |
| 16 | Image | Plano | — | | | | |

Reference wavelength (d-line) is 587.6 nm

TABLE 14

Aspheric Coefficients

| | Surface # | | | | | |
|---|---|---|---|---|---|---|
| | 1 | 2 | 4 | 5 | 6 | 7 |
| k = | −6.6551E−02 | −6.5559E+00 | −5.0994E+00 | −1.7565E+01 | 1.4593E+00 | 3.0000E+00 |
| A4 = | −1.3004E−01 | −1.2983E−01 | −1.6839E−01 | −1.1775E−01 | −2.9291E−01 | −3.4015E−01 |
| A6 = | 2.5655E−01 | 8.7976E−01 | 8.5828E−01 | −2.0722E−02 | −6.2942E−03 | −2.5717E−02 |
| A8 = | −4.6812E−01 | −1.8486E+00 | −1.6121E+00 | 1.0966E−01 | −3.7395E−02 | −2.8111E−03 |
| A10 = | 3.4374E−01 | 1.7928E+00 | 1.4785E+00 | −8.2521E−02 | 1.7631E−01 | 2.4774E−01 |
| A12 = | −1.2206E−01 | −7.1223E−01 | −4.0300E−01 | −1.3566E−01 | 1.9933E−01 | −1.1011E−01 |
| A14 = | | | | 4.7317E−01 | −2.4101E−01 | −3.2864E−02 |

| | Surface # | | | | | |
|---|---|---|---|---|---|---|
| | 8 | 9 | 10 | 11 | 12 | 13 |
| k = | −3.6708E+00 | −7.0259E−02 | −8.1393E+00 | 3.0000E+00 | −1.9725E+01 | −2.9960E+00 |
| A4 = | −3.3483E−01 | −2.7649E−01 | 7.8826E−02 | 1.7557E−01 | −1.9002E−01 | −1.8222E−01 |
| A6 = | 1.0301E−01 | 3.0532E−01 | −1.9025E−01 | −3.8131E−01 | 3.5324E−02 | 9.7623E−02 |
| A8 = | 4.9124E−01 | 4.3277E−03 | 9.2275E−02 | 3.0878E−01 | 1.8523E−02 | −4.2574E−02 |
| A10 = | −6.8986E−01 | −1.1447E−01 | −3.0406E−02 | −1.7157E−01 | −1.0336E−02 | 1.2934E−02 |
| A12 = | 5.3815E−01 | 5.5969E−02 | −9.2850E−04 | 6.0698E−02 | 2.2036E−03 | −2.4524E−03 |
| A14 = | −1.7648E−01 | 9.7684E−03 | 2.3767E−03 | −1.1501E−02 | −2.3069E−04 | 2.5592E−04 |
| A16 = | | | | 8.6055E−04 | 9.7129E−06 | −1.1161E−05 |

In the image system lens assembly according to the 7th embodiment, the definitions of f, Fno, HFOV, V4, V5, R11, R12, f1, f2, ΣCT, Td, TTL, and ImgH are the same as those stated in the 1st embodiment with corresponding values for the 7th embodiment. Moreover, these parameters can be calculated from Table 13 and Table 14 as the following values and satisfy the following relationships:

| | | | |
|---|---|---|---|
| f (mm) | 3.68 | f/f1 | −0.50 |
| Fno | 2.50 | f/f2 | 1.58 |
| HFOV (deg.) | 37.4 | ΣCT/Td | 0.69 |
| V4/V5 | 0.42 | f/tan(HFOV) (mm) | 4.81 |
| (R11 − R12)/(R11 + R12) | 0.24 | TTL/ImgH | 1.66 |

8th Embodiment

Figure 15:
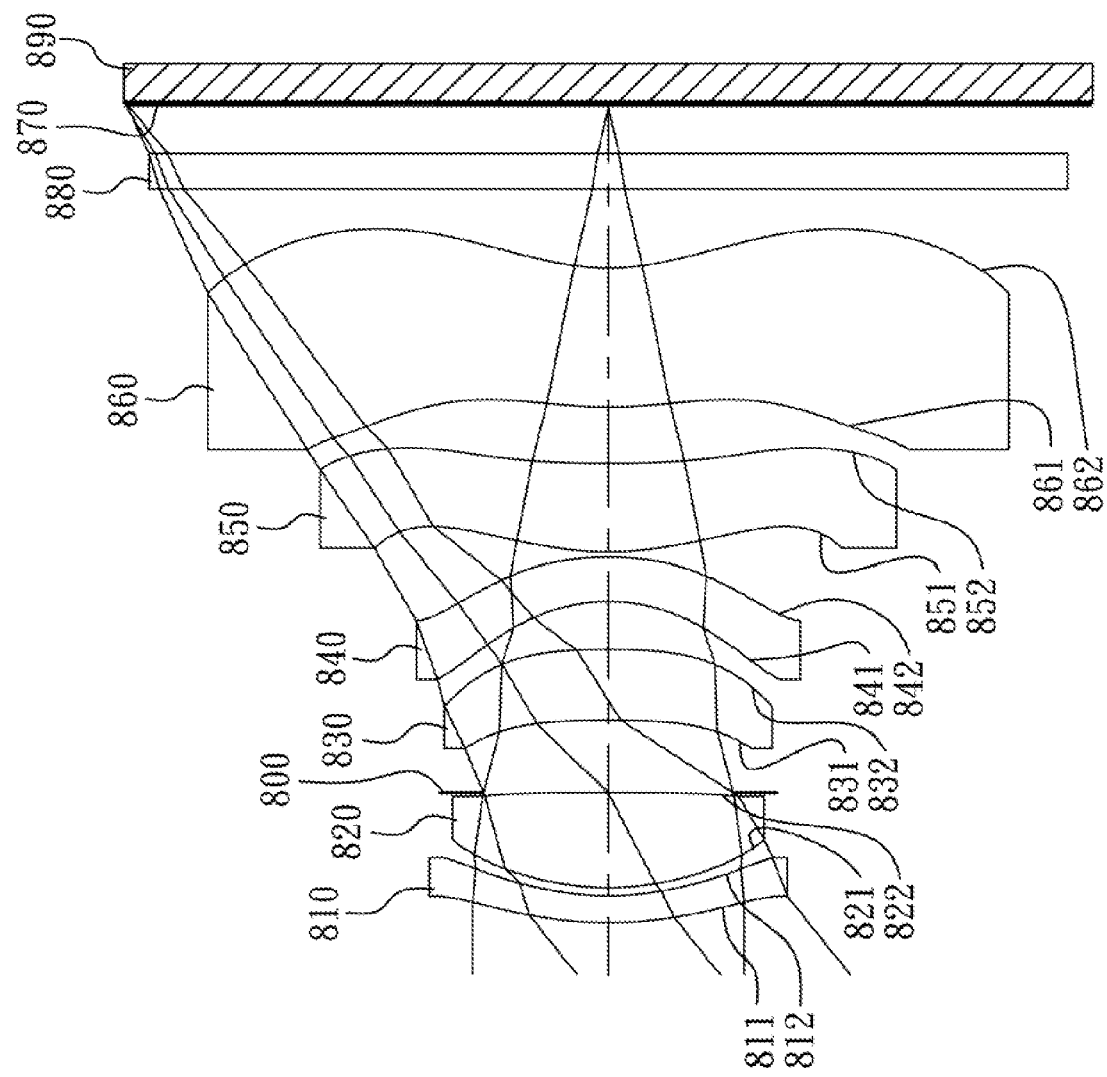
FIG. 15 is a schematic view of an image system lens assembly according to the 8th embodiment of the present disclosure.
Figure 16:
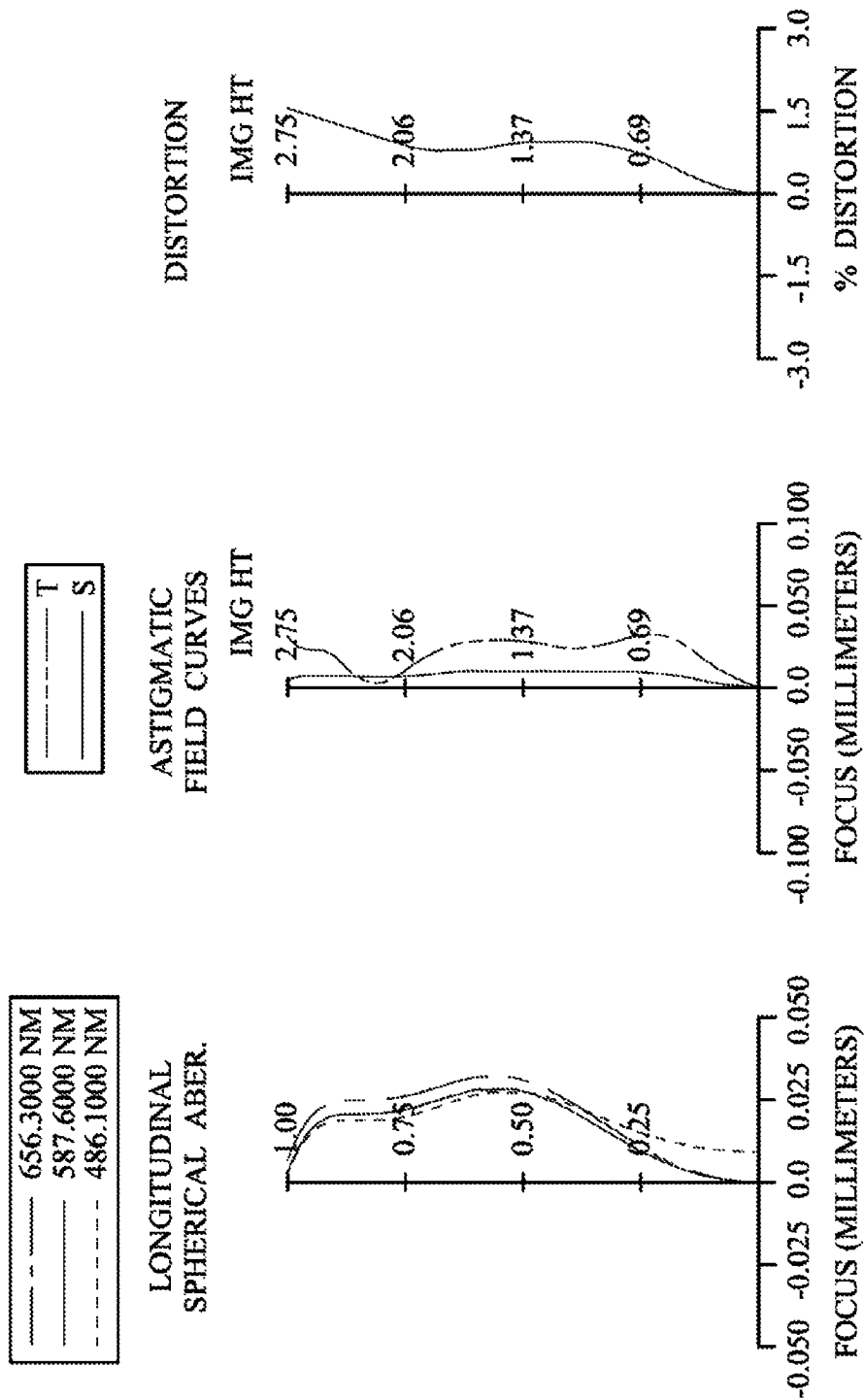
FIG. 16 shows spherical aberration curves, astigmatic field curves and a distortion curve of the image system lens assembly according to the 8th embodiment.

FIG. 15 is a schematic view of an image system lens assembly according to the 8th embodiment of the present disclosure. FIG. 16 shows spherical aberration curves, astigmatic field curves and a distortion curve of the image system lens assembly according to the 8th embodiment. In FIG. 15, the image system lens assembly includes, in order from an object side to an image side, a first lens element 810, a second lens element 820, an aperture stop 800, a third lens element 830, a fourth lens element 840, a fifth lens element 850, a sixth lens element 860, an IR-cut filter 880, an image plane 870, and an image sensor 890.

The first lens element 810 with negative refractive power has a convex object-side surface 811 and a concave image-side surface 812. The first lens element 810 is made of plastic material and has the object-side surface 811 and the image-side surface 812 being aspheric.

The second lens element 820 with positive refractive power has a convex object-side surface 821 and a convex image-side surface 822. The second lens element 820 is made of plastic material and has the object-side surface 821 and the image-side surface 822 being aspheric.

The third lens element 830 with positive refractive power has a concave object-side surface 831 and a convex image-side surface 832. The third lens element 830 is made of plastic material and has the object-side surface 831 and the image-side surface 832 being aspheric.

The fourth lens element 840 with negative refractive power has a concave object-side surface 841 and a convex image-side surface 842. The fourth lens element 840 is made of plastic material and has the object-side surface 841 and the image-side surface 842 being aspheric.

The fifth lens element 850 with positive refractive power has a convex object-side surface 851 and a concave image-side surface 852, wherein the object-side surface 851 of the fifth lens element 850 changes from convex at a paraxial region to concave at a peripheral region, and the image-side surface 852 of the fifth lens element 850 changes from concave at a paraxial region to convex at a peripheral region. The fifth lens element 850 is made of plastic material and has the object-side surface 851 and the image-side surface 852 being aspheric.

The sixth lens element 860 with negative refractive power has a convex object-side surface 861 and a concave image-side surface 862, wherein the image-side surface 862 of the sixth lens element 860 changes from concave at a paraxial region to convex at a peripheral region. The sixth lens element 860 is made of plastic material and has the object-side surface 861 and the image-side surface 862 being aspheric.

The IR-cut filter 880 is made of glass material, wherein the IR-cut filter 880 is located between the sixth lens element 860 and the image plane 870, and will not affect the focal length of the image system lens assembly.

The detailed optical data of the 8th embodiment are shown in Table 15 and the aspheric surface data are shown in Table 16 below.

TABLE 15

8th Embodiment
f = 3.39 mm, Fno = 2.20, HFOV = 38.5 deg.

| Surface # | | Curvature Radius | Thickness | Material | Index | Abbe # | Focal length |
|---|---|---|---|---|---|---|---|
| 0 | Object | Plano | Infinity | | | | |
| 1 | Lens 1 | 2.166 (ASP) | 0.153 | Plastic | 1.640 | 23.3 | −10.02 |
| 2 | | 1.575 (ASP) | 0.045 | | | | |
| 3 | Lens 2 | 1.473 (ASP) | 0.538 | Plastic | 1.544 | 55.9 | 2.67 |
| 4 | | −100.000 (ASP) | −0.001 | | | | |
| 5 | Ape. Stop | Plano | 0.416 | | | | |
| 6 | Lens 3 | −6.478 (ASP) | 0.400 | Plastic | 1.544 | 55.9 | 17.31 |
| 7 | | −3.922 (ASP) | 0.275 | | | | |
| 8 | Lens 4 | −1.007 (ASP) | 0.250 | Plastic | 1.650 | 21.4 | −4.11 |
| 9 | | −1.775 (ASP) | 0.030 | | | | |
| 10 | Lens 5 | 1.814 (ASP) | 0.507 | Plastic | 1.544 | 55.9 | 3.82 |
| 11 | | 12.906 (ASP) | 0.316 | | | | |
| 12 | Lens 6 | 2.617 (ASP) | 0.793 | Plastic | 1.530 | 55.8 | −6.61 |
| 13 | | 1.341 (ASP) | 0.450 | | | | |
| 14 | IR-cut filter | Plano | 0.200 | Glass | 1.517 | 64.2 | — |
| 15 | | Plano | 0.282 | | | | |
| 16 | Image | Plano | — | | | | |

Reference wavelength (d-line) is 587.6 nm

TABLE 16

Aspheric Coefficients

| Surface # | | | | | |
|---|---|---|---|---|---|
| 1 | 2 | 3 | 4 | 6 | 7 |
| k = 4.4038E−02 | −7.8141E+00 | −3.3795E+00 | −1.0000E+00 | −1.0000E+00 | −7.6897E+00 |
| A4 = −1.2905E−01 | −1.1984E−01 | −1.5587E−01 | −6.9591E−02 | −2.2264E−01 | −2.9389E−01 |
| A6 = 2.9857E−01 | 9.0811E−01 | 8.4778E−01 | −5.8127E−02 | −2.6840E−02 | −2.9731E−02 |
| A8 = −5.1595E−01 | −1.8798E+00 | −1.5275E+00 | 1.0845E−01 | −1.4853E−01 | −8.0225E−02 |
| A10 = 3.5499E−01 | 1.7643E+00 | 1.3745E+00 | 1.8344E−01 | 1.2817E−01 | 2.1444E−01 |
| A12 = −1.0179E−01 | −6.6164E−01 | −4.0218E−01 | −5.1178E−01 | 1.6134E−01 | −9.6216E−02 |
| A14 = | | | 4.7318E−01 | −1.1844E−01 | 1.3470E−02 |

| Surface # | | | | | |
|---|---|---|---|---|---|
| 8 | 9 | 10 | 11 | 12 | 13 |
| k = −3.4056E+00 | 1.8392E−02 | −1.5100E+01 | 2.1574E+00 | −1.1532E+01 | −3.2940E+00 |
| A4 = −3.5926E−01 | −2.6585E−01 | 7.6862E−02 | 2.2322E−01 | −1.8406E−01 | −1.6246E−01 |
| A6 = 9.8381E−02 | 3.0181E−01 | −1.5997E−01 | −3.6728E−01 | 3.3614E−02 | 9.2535E−02 |
| A8 = 4.8811E−01 | −3.1396E−03 | 9.0526E−02 | 3.0769E−01 | 1.8599E−02 | −4.2289E−02 |
| A10 = −7.0095E−01 | −1.1924E−01 | −2.2593E−02 | −1.7255E−01 | −1.0054E−02 | 1.2991E−02 |
| A12 = 5.1312E−01 | 5.3016E−02 | −9.9750E−04 | 6.0487E−02 | 2.2845E−03 | −2.4528E−03 |
| A14 = −1.4732E−01 | 6.8630E−03 | 2.4837E−03 | −1.1517E−02 | −2.3372E−04 | 2.5544E−04 |
| A16 = | | −9.6081E−05 | 8.7603E−04 | −9.4301E−06 | −1.1294E−05 |

In the image system lens assembly according to the 8th embodiment, the definitions of f, Fno, HFOV, V4, V5, R11, R12, f1, f2, ΣCT, Td, TTL, and ImgH are the same as those stated in the 1st embodiment with corresponding values for the 8th embodiment. Moreover, these parameters can be calculated from Table 15 and Table 16 as the following values and satisfy the following relationships:

| | | | |
|---|---|---|---|
| f (mm) | 3.39 | f/f1 | −0.34 |
| Fno | 2.20 | f/f2 | 1.27 |
| HFOV (deg.) | 38.5 | ΣCT/Td | 0.71 |
| V4/V5 | 0.38 | f/tan(HFOV) (mm) | 4.27 |
| (R11 − R12)/(R11 + R12) | 0.32 | TTL/ImgH | 1.67 |

9th Embodiment

Figure 17:
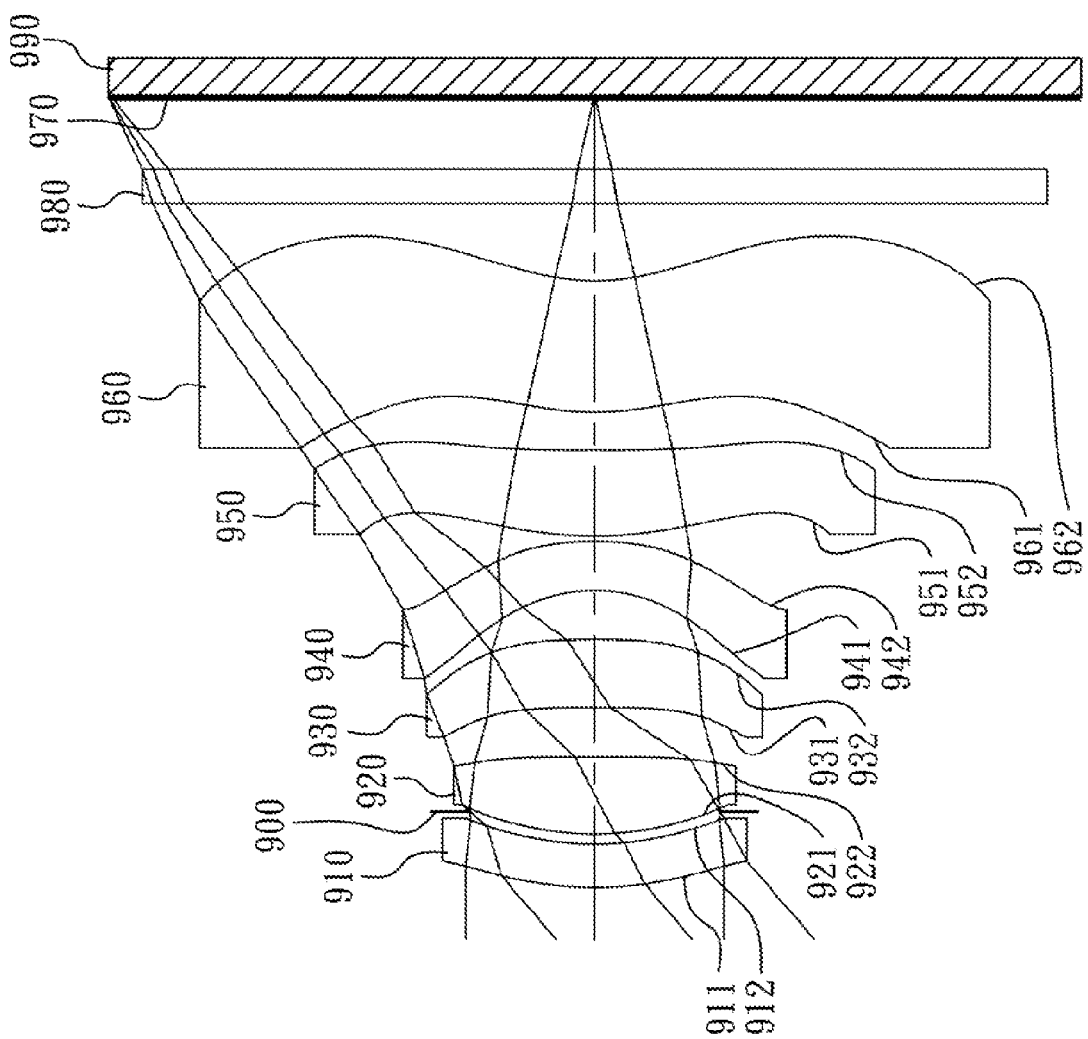
FIG. 17 is a schematic view of an image system lens assembly according to the 9th embodiment of the present disclosure.
Figure 18:
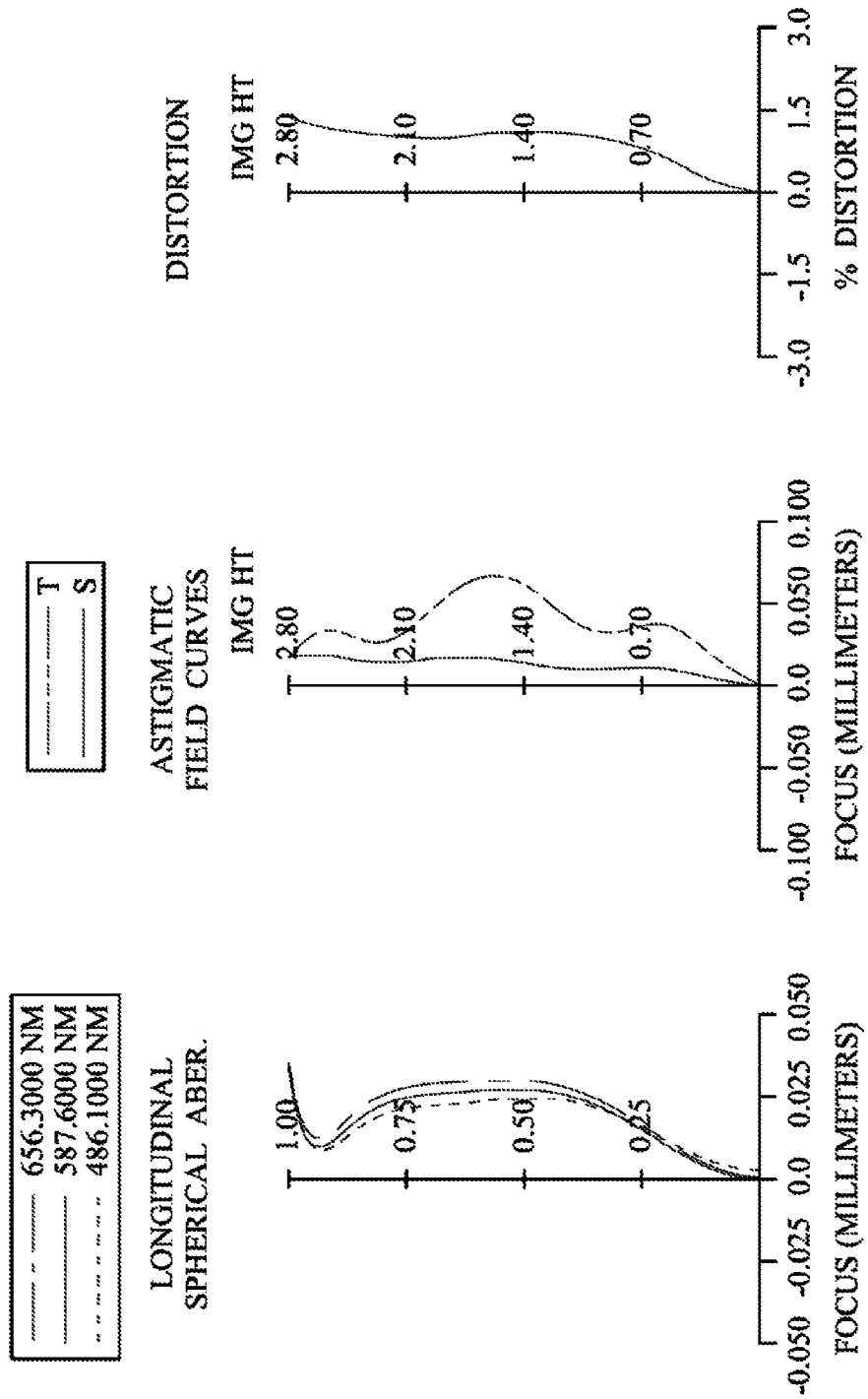
FIG. 18 shows spherical aberration curves, astigmatic field curves and a distortion curve of the image system lens assembly according to the 9th embodiment.

FIG. 17 is a schematic view of an image system lens assembly according to the 9th embodiment of the present disclosure. FIG. 18 shows spherical aberration curves, astigmatic field curves and a distortion curve of the image system lens assembly according to the 9th embodiment. In FIG. 17, the image system lens assembly includes, in order from an object side to an image side, a first lens element 910, an aperture stop 900, a second lens element 920, a third lens element 930, a fourth lens element 940, a fifth lens element 950, a sixth lens element 960, an IR-cut filter 980, an image plane 970 and an image sensor 990.

The first lens element 910 with negative refractive power has a convex object-side surface 911 and a concave image-side surface 912. The first lens element 910 is made of plastic material and has the object-side surface 911 and the image-side surface 912 being aspheric.

The second lens element 920 with positive refractive power has a convex object-side surface 921 and a planar image-side surface 922. The second lens element 920 is made of glass material and has the object-side surface 921 and the image-side surface 922 being aspheric.

The third lens element 930 with positive refractive power has a concave object-side surface 931 and a convex image-side surface 932. The third lens element 930 is made of plastic material and has the object-side surface 931 and the image-side surface 932 being aspheric.

The fourth lens element 940 with negative refractive power has a concave object-side surface 941 and a convex image-side surface 942. The fourth lens element 940 is made of plastic material and has the object-side surface 941 and the image-side surface 942 being aspheric.

The fifth lens element 950 with positive refractive power has a convex object-side surface 951 and a convex image-side surface 952, wherein the object-side surface 951 of the fifth lens element 950 changes from convex at a paraxial region to concave at a peripheral region. The fifth lens element 950 is made of plastic material and has the object-side surface 951 and the image-side surface 952 being aspheric.

The sixth lens element 950 with negative refractive power has a convex object-side surface 961 and a concave image-side surface 982, wherein the image-side surface 962 of the sixth lens element 960 changes from concave at a paraxial region to convex at a peripheral region. The sixth lens element 960 is made of plastic material and has the object-side surface 961 and the image-side surface 962 being aspheric.

The IR-cut filter 980 is made of glass material, wherein the IR-cut filter 980 is located between the sixth lens element 960 and the image plane 970, and will not affect the focal length of the image system lens assembly.

The detailed optical data of the 9th embodiment are shown in Table 17 and the aspheric surface data are shown in Table 18 below.

TABLE 17

9th Embodiment
f = 3.20 mm, Fno = 2.15, HFOV = 40.7 deg.

| Surface # | | Curvature Radius | Thickness | Material | Index | Abbe # | Focal length |
|---|---|---|---|---|---|---|---|
| 0 | Object | Plano | Infinity | | | | |
| 1 | Lens 1 | 2.015 (ASP) | 0.250 | Plastic | 1.640 | 23.3 | −19.53 |
| 2 | | 1.652 (ASP) | 0.189 | | | | |
| 3 | Ape. Stop | Plano | −0.130 | | | | |
| 4 | Lens 2 | 1.654 (ASP) | 0.440 | Glass | 1.542 | 62.9 | 3.05 |
| 5 | | ∞ (ASP) | 0.287 | | | | |
| 6 | Lens 3 | −14.818 (ASP) | 0.391 | Plastic | 1.535 | 56.3 | 11.27 |
| 7 | | −4.322 (ASP) | 0.285 | | | | |
| 8 | Lens 4 | −0.905 (ASP) | 0.279 | Plastic | 1.640 | 23.3 | −3.27 |
| 9 | | −1.790 (ASP) | 0.030 | | | | |
| 10 | Lens 5 | 2.157 (ASP) | 0.500 | Plastic | 1.535 | 56.3 | 3.90 |
| 11 | | −59.694 (ASP) | 0.216 | | | | |
| 12 | Lens 6 | 1.620 (ASP) | 0.754 | Plastic | 1.535 | 56.3 | −19.76 |
| 13 | | 1.177 (ASP) | 0.450 | | | | |
| 14 | IR-cut filter | Plano | 0.200 | Glass | 1.517 | 64.2 | — |
| 15 | | Plano | 0.408 | | | | |
| 16 | Image | Plano | — | | | | |

Reference wavelength (d-line) is 587.6 nm

TABLE 18

Aspheric Coefficients

| | Surface # | | | | | |
|---|---|---|---|---|---|---|
| | 1 | 2 | 4 | 5 | 6 | 7 |
| k = | 5.2664E−01 | −5.9283E+00 | −3.5530E+00 | 0.0000E+00 | 0.0000E+00 | −1.9743E+01 |
| A4 = | −1.1422E−01 | −1.1773E−01 | −1.5036E−01 | −1.5013E−01 | −2.6119E−01 | −2.8064E−01 |
| A6 = | 2.5456E−01 | 8.7307E−01 | 8.3271E−01 | −3.9042E−02 | −4.5031E−02 | −6.4552E−02 |
| A8 = | −5.2149E−01 | −1.8891E+00 | −1.7372E+00 | 2.1926E−01 | −9.7777E−02 | −3.1606E−02 |
| A10 = | 4.1126E−01 | 1.8307E+00 | 1.8507E+00 | −2.7683E−01 | 1.6233E−01 | 2.5031E−01 |
| A12 = | −1.5035E−01 | −6.7950E−01 | −7.0115E−01 | −1.8952E−01 | 2.2136E−01 | −9.5452E−02 |
| A14 = | | | | 6.5005E−01 | −1.7167E−01 | −3.2762E−02 |

| | Surface # | | | | | |
|---|---|---|---|---|---|---|
| | 8 | 9 | 10 | 11 | 12 | 13 |
| k = | −2.6923E+00 | 4.0053E−01 | −1.6497E+01 | −2.0000E+01 | −5.0080E+00 | −2.8660E+00 |
| A4 = | −3.7062E−01 | −2.8757E−01 | 7.7593E−02 | 2.3871E−01 | −2.0185E−01 | −1.7479E−01 |
| A6 = | 9.2214E−02 | 3.0050E−01 | −1.5090E−01 | −3.6866E−01 | 3.1090E−02 | 9.7308E−02 |
| A8 = | 4.8736E−01 | 1.8422E−03 | 8.8800E−02 | 3.0707E−01 | 1.8593E−02 | −4.2893E−02 |
| A10 = | −6.9313E−01 | −1.1638E−01 | −3.2254E−02 | −1.7296E−01 | −9.9549E−03 | 1.2945E−02 |
| A12 = | 5.3321E−01 | 5.3399E−02 | −8.6395E−04 | 6.0413E−02 | 2.2881E−03 | −2.4451E−03 |
| A14 = | −1.6590E−01 | 8.0930E−03 | 2.0994E−03 | −1.1504E−02 | −2.3623E−04 | 2.5696E−04 |
| A16 = | | | | 8.9606E−04 | −7.1230E−06 | −1.1525E−05 |

In the image system lens assembly according to the 9th embodiment, the definitions of f, Fno, HFOV, V4, V5, R11, R12, f1, f2, ΣCT, Td, TTL, and ImgH are the same as those stated in the 1st embodiment with corresponding values for the 9th embodiment. Moreover, these parameters can be calculated from Table 17 and Table 18 as the following values and satisfy the following relationships:

| | | | |
|---|---|---|---|
| f (mm) | 3.20 | f/f1 | −0.16 |
| Fno | 2.15 | f/f2 | 1.05 |
| HFOV (deg.) | 40.7 | ΣCT/Td | 0.75 |
| V4/V5 | 0.41 | f/tan(HFOV) (mm) | 3.72 |
| (R11 − R12)/(R11 + R12) | 0.16 | TTL/ImgH | 1.60 |

10th Embodiment

Figure 19:
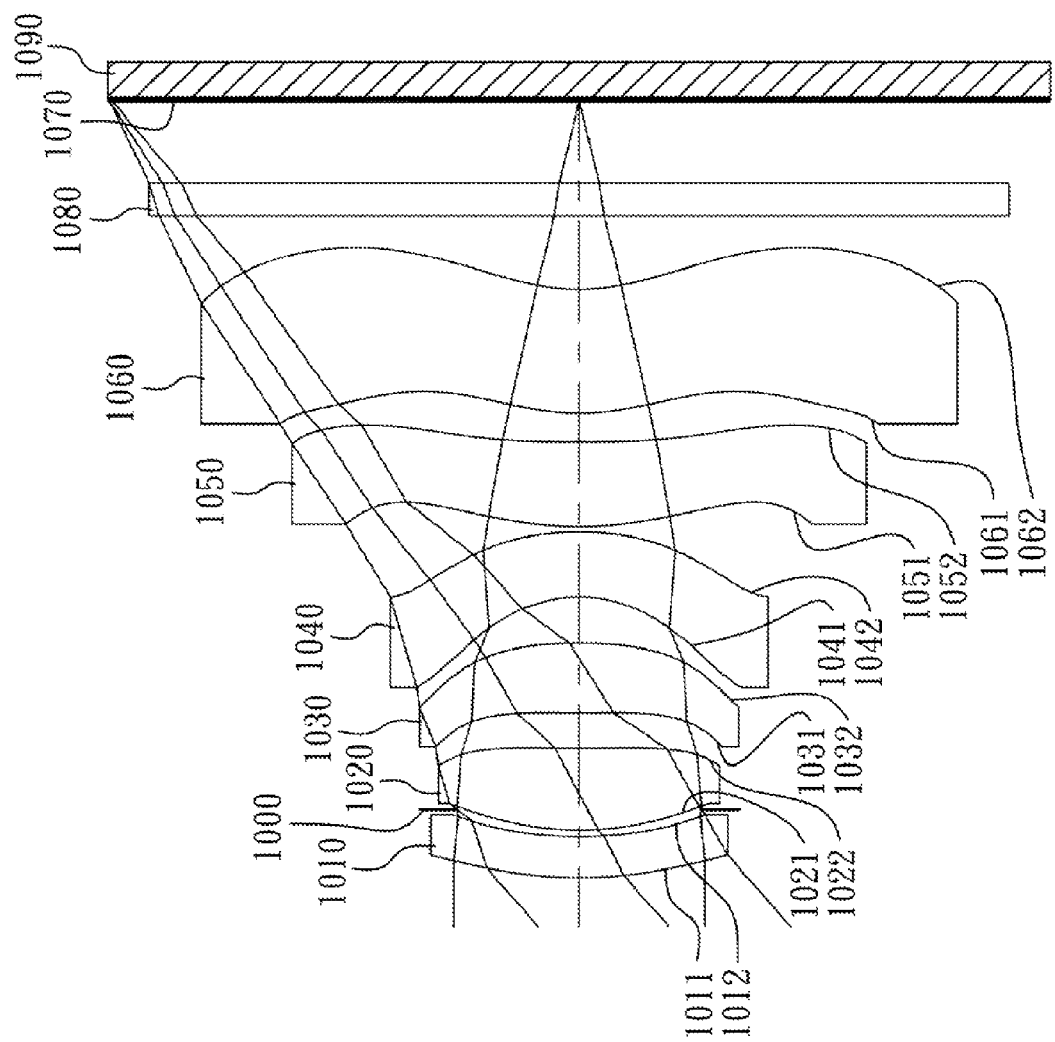
FIG. 19 is a schematic view of an image system lens assembly according to the 10th embodiment of the present disclosure.
Figure 20:
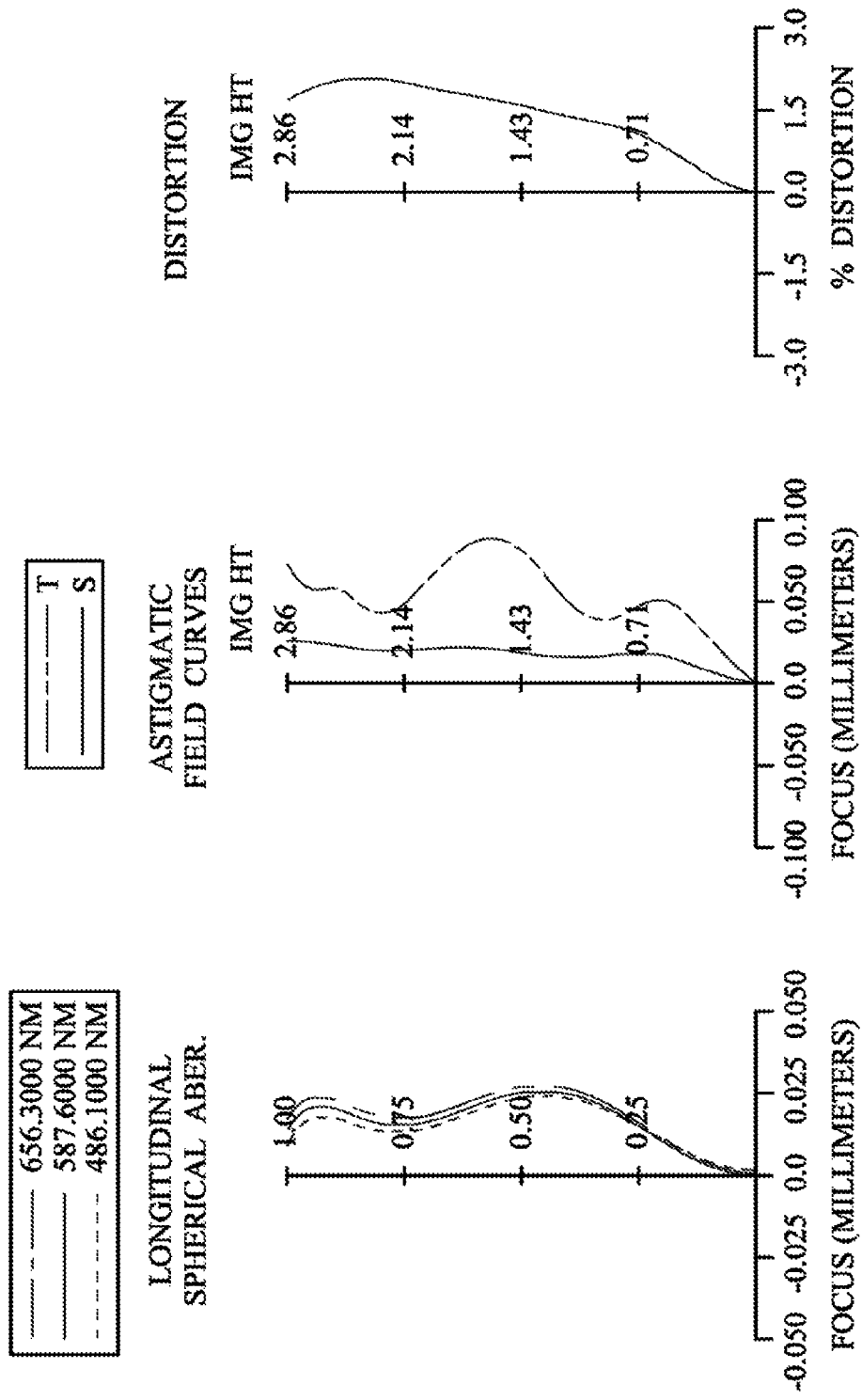
FIG. 20 shows spherical aberration curves, astigmatic field curves and a distortion curve of the image system lens assembly according to the 10th embodiment.

FIG. 19 is a schematic view of an image system lens assembly according to the 10th embodiment of the present disclosure. FIG. 20 shows spherical aberration curves, astigmatic field curves and a distortion curve of the image system lens assembly according to the 10th embodiment. In FIG. 19, the image system lens assembly includes, in order from an object side to an image side, a first lens element 1010, aperture stop 1000, a second lens element 1020, a third lens element 1030, a fourth lens element 1040, a fifth lens element 1050, a sixth lens element 1060, an IR-cut filter 1080, an image plane 1070, and an image sensor 1090.

The first lens element 1010 with negative refractive power has a convex object-side surface 1011 and a concave image-side surface 1012. The first lens element 1010 is made of plastic material and has the object-side surface 1011 and the image-side surface 1012 being aspheric.

The second lens element 1020 with positive refractive power has a convex object-side surface 1021 and a concave image-side surface 1022. The second lens element 1020 is made of plastic material and has the object-side surface 1021 and the image-side surface 1022 being aspheric.

The third lens element 1030 with positive refractive power has a convex object-side surface 1031 and a convex image-side surface 1032. The third lens element 1030 is made of plastic material and has the object-side surface 1031 and the image-side surface 1032 being aspheric.

The fourth lens element 1040 with negative refractive power has a concave object-side surface 1041 and a convex image-side surface 1042. The fourth lens element 1040 is made of plastic material and has the object-side surface 1041 and the image-side surface 1042 being aspheric.

The fifth lens element 1050 with positive refractive power has a convex object-side surface 1051 and a concave image-side surface 1052, wherein the object-side surface 1051 of the fifth lens element 1050 changes from convex at a paraxial region to concave at a peripheral region, and the image-side surface 1052 of the fifth lens element 1050 changes from concave at a paraxial region to convex at a peripheral region. The fifth lens element 1050 is made of plastic material and has the object-side surface 1051 and the image-side surface 1052 being aspheric.

The sixth lens element 1060 with positive refractive power has a convex object-side surface 1061 and a concave image-side surface 1062, wherein the image-side surface 1062 of the sixth lens element 1060 changes from concave at a paraxial region to convex at a peripheral region. The sixth lens element 1060 is made of plastic material and has the object-side surface 1061 and the image-side surface 1062 being aspheric.

The IR-cut filter 1080 is made of glass material, wherein the IR-cut filter 1080 is located between the sixth lens element 1060 and the image plane 1070, and will not affect the focal length of the image system lens assembly.

The detailed optical data of the 10th embodiment are shown in Table 19 and the aspheric surface data are shown in Table 20 below.

TABLE 19

10th Embodiment
f = 3.20 mm, Fno = 2.10, HFOV = 41.2 deg.

| Surface # | | Curvature Radius | Thickness | Material | Index | Abbe # | Focal length |
|---|---|---|---|---|---|---|---|
| 0 | Object | Plano | Infinity | | | | |
| 1 | Lens 1 | 2.646 (ASP) | 0.250 | Plastic | 1.633 | 23.4 | −50.39 |
| 2 | | 2.353 (ASP) | 0.165 | | | | |
| 3 | Ape. Stop | Plano | −0.125 | | | | |
| 4 | Lens 2 | 1.825 (ASP) | 0.493 | Plastic | 1.535 | 56.3 | 3.99 |
| 5 | | 11.517 (ASP) | 0.217 | | | | |
| 6 | Lens 3 | 22.861 (ASP) | 0.422 | Plastic | 1.535 | 56.3 | 4.89 |
| 7 | | −2.932 (ASP) | 0.283 | | | | |
| 8 | Lens 4 | −0.814 (ASP) | 0.395 | Plastic | 1.640 | 23.3 | −2.51 |
| 9 | | −1.968 (ASP) | 0.030 | | | | |
| 10 | Lens 5 | 2.157 (ASP) | 0.518 | Plastic | 1.535 | 56.3 | 4.37 |
| 11 | | 26.055 (ASP) | 0.171 | | | | |
| 12 | Lens 6 | 1.402 (ASP) | 0.751 | Plastic | 1.535 | 56.3 | 42.85 |
| 13 | | 1.214 (ASP) | 0.450 | | | | |
| 14 | IR-cut filter | Plano | 0.200 | Glass | 1.517 | 64.2 | — |
| 15 | | Plano | 0.503 | | | | |
| 16 | Image | Plano | — | | | | |

Reference wavelength (d-line) is 587.6 nm

TABLE 20

Aspheric Coefficients

| | Surface # | | | | | |
|---|---|---|---|---|---|---|
| | 1 | 2 | 4 | 5 | 6 | 7 |
| k = | 2.8340E+00 | −4.8095E+00 | −1.8680E+00 | 0.0000E+00 | 0.0000E+00 | −1.5668E+01 |
| A4 = | −7.0480E−02 | −1.0015E−01 | −1.3063E−01 | −1.9429E−01 | −2.6177E−01 | −2.9526E−01 |
| A6 = | 2.2492E−01 | 8.9371E−01 | 7.9423E−01 | −9.3708E−02 | −1.2458E−01 | −1.1239E−01 |
| A8 = | −5.2497E−01 | −1.9763E+00 | −1.7299E+00 | 1.5989E−01 | −2.2011E−01 | −5.7691E−02 |
| A10 = | 4.5921E−01 | 1.7809E+00 | 1.6046E+00 | −2.0472E−01 | 4.3030E−02 | 2.6240E−01 |
| A12 = | −1.5691E−01 | −4.1543E−01 | −5.4239E−01 | −2.5973E−01 | 2.6220E−01 | −8.1769E−02 |
| A14 = | | | | 3.5845E−01 | −4.3999E−02 | −6.8450E−03 |

| | Surface # | | | | | |
|---|---|---|---|---|---|---|
| | 8 | 9 | 10 | 11 | 12 | 13 |
| k = | −2.3292E+00 | 5.5512E−01 | −1.4135E+01 | −1.0000E+00 | −4.2043E+00 | −2.5566E+00 |
| A4 = | −3.8380E−01 | −2.8622E−01 | 7.1440E−02 | 2.4203E−01 | −1.8277E−01 | −1.8489E−01 |
| A6 = | 9.6448E−02 | 2.8447E−01 | −1.3602E−01 | −3.6245E−01 | 3.0499E−02 | 1.0128E−01 |
| A8 = | 4.9760E−01 | −5.4578E−05 | 8.2955E−02 | 3.0668E−01 | 1.8059E−02 | −4.3474E−02 |

TABLE 20-continued

| Aspheric Coefficients | | | | | |
|---|---|---|---|---|---|
| A10 = | −6.8021E−01 | −1.1338E−01 | −3.1862E−02 | −1.7315E−01 | −9.9588E−03 | 1.2920E−02 |
| A12 = | 5.4383E−01 | 5.3163E−02 | 6.1060E−05 | 6.0409E−02 | 2.2856E−03 | −2.4295E−03 |
| A14 = | −1.8215E−01 | 3.2618E−03 | 1.9378E−03 | −1.1492E−02 | −2.3351E−04 | 2.5720E−04 |
| A16 = | | | | 8.9578E−04 | −2.5947E−06 | −1.1701E−05 |

In the image system lens assembly according to the 10th embodiment, the definitions of f, Fno, HFOV, V4, V5, R11, R12, f1, f2, ΣCT, Td, TTL, and ImgH are the same as those stated in the 1st embodiment with corresponding values for the 10th embodiment. Moreover, these parameters can be calculated from Table 19 and Table 20 as the following values and satisfy the following relationships:

| | | | |
|---|---|---|---|
| f (mm) | 3.20 | f/f1 | −0.06 |
| Fno | 2.10 | f/f2 | 0.80 |
| HFOV (deg.) | 41.2 | ΣCT/Td | 0.79 |
| V4/V5 | 0.41 | f/tan(HFOV) (mm) | 3.66 |
| (R11 − R12)/(R11 + R12) | 0.07 | TTL/ImgH | 1.63 |

It will be apparent to those skilled in the art that various modifications and variations can be made to the structure of the present invention without departing from the scope or spirit of the invention. In view of the foregoing, it is intended that the present invention cover modifications and variations of this invention provided they fall within the scope of the following claims.

What is claimed is:

1. An image system lens assembly comprising, in order from an object side to an image side:
   a first lens element with negative refractive power having a convex object-side surface and a concave image-side surface;
   a second lens element with positive refractive power;
   a third lens element with refractive power;
   a fourth lens element with negative refractive power having a concave object-side surface and a convex image-side surface;
   a fifth lens element with positive refractive power made of plastic material, wherein at least one of an object-side surface and an image-side surface of the fifth lens element is aspheric; and
   a sixth lens element with refractive power made of plastic material, and having a convex object-side surface and a concave image-side surface, wherein the image-side surface of the sixth lens element changes from concave at a paraxial region to convex at a peripheral region, and at least one of the object-side surface and the image-side surface of the sixth lens element is aspheric;
   wherein a focal length of the image system lens assembly is f, a focal length of the first lens element is f1, a focal length of the second lens element is f2, and the following relationships are satisfied:

$-0.8 < f/f1 < 0$; and $0.7 < f/f2 < 2.4$.

2. The image system lens assembly of claim 1, wherein an object-side surface of the second lens element and the object-side surface of the fifth lens element are convex.

3. The image system lens assembly of claim 2, wherein the focal length the image system lens assembly is f, the focal length of the first lens element is f1, the focal length of the second lens element is f2, a focal length of the third lens element is f3, a focal length of the fourth lens element if f4, a focal length of the fifth lens element is f5, a focal length of the sixth lens element is f6, and the following relationship is satisfied:

$f/f2 > f/fi, i=1,3,4,5,6$.

4. The image system lens assembly of claim 3, wherein an axial distance between the first lens element and the second lens element is T12, an axial distance between the second lens element and the third lens element is T23, an axial distance between the third lens element and the fourth lens element is T34, an axial distance between the fourth lens element and the fifth lens element is T45, an axial distance between the fifth lens element and the sixth lens element is T56, and the following relationships are satisfied:

$T23 > T12$;

$T23 > T34$;

$T23 > T45$; and $T23 > T56$.

5. The image system lens assembly of claim 3, wherein an Abbe number of the fourth lens element is V4, an Abbe number of the fifth lens element is V5, and the following relationship is satisfied:

$0.2 < V4/V5 < 0.6$.

6. The image system lens assembly of claim 3, wherein the focal length of the image system lens assembly is f, a half of a maximal field of view of the image system lens assembly is HFOV, and the following relationship is satisfied:

$3.0 \text{ mm} < f/\tan(HFOV) < 6.0 \text{ mm}$.

7. The image system lens assembly of claim 2, wherein the image-side surface of the fifth lens element is concave.

8. The image system lens assembly of claim 2, wherein the object-side surface of the fifth lens element changes from convex at a paraxial region to concave at a peripheral region.

9. The image system lens assembly of claim 8, wherein a curvature radius of the object-side surface of the sixth lens element is R11, a curvature radius of the image-side surface of the sixth lens element is R12, and the following relationship is satisfied:

$-0.10 < (R11-R12)/(R11+R2) < 0.45$.

10. The image system lens assembly of claim 8, wherein the focal length of the image system lens assembly is f, the focal length of the second lens element is f2, and the following relationship is satisfied:

$1.0 < f/f2 < 1.8$.

11. The image system lens assembly of claim 1, wherein a sum of central thicknesses of the first through sixth lens elements is ΣCT, an axial distance between the object-side surface of the first lens element and the image-side surface of the sixth lens element is Td, and the following relationship is satisfied:

$$0.65 < \Sigma CT/Td < 0.90.$$

12. The image system lens assembly of claim 1, wherein a maximum image height of the image system lens assembly is ImgH, an axial distance between the object-side surface of the first lens element and an image plane is TTL, and the following relationship is satisfied:

$$TTL/ImgH < 1.8.$$

13. An image system lens assembly comprising, in order from an object side to an image side:
   a first lens element with negative refractive power having a convex object-side surface and a concave image-side surface;
   a second lens element with positive refractive power;
   a third lens element with refractive power;
   a fourth lens element with negative refractive power;
   a fifth lens element with positive refractive power made of plastic material, wherein at least one of an object-side surface and an image-side surface of the fifth lens element is aspheric; and
   a sixth lens element with refractive power made of plastic material, and having a concave image-side surface, wherein the image-side surface of the sixth lens element changes from concave at a paraxial region to convex at a peripheral region, and at least one of an object-side surface and the image-side surface of the sixth lens element is aspheric;
   wherein a focal length of the image system lens assembly is f, a focal length of the second lens element is f2, a sum of central thicknesses of the first through sixth lens elements is ΣCT, an axial distance between the object-side surface of the first lens element and the image-side surface of the sixth lens element is Td, and the following relationships are satisfied:

$$0.55 < \Sigma CT/Td < 0.90;\text{ and}$$

$$0.7 < f/f2 < 2.4.$$

14. The image system lens assembly of claim 13, wherein an object-side surface of the second lens element and the object-side surface of the fifth lens element are convex.

15. The image system lens assembly of claim 14, wherein the sum of central thicknesses of the first through sixth lens elements is ΣCT, the axial distance between the object-side surface of the first lens element and the image-side surface of the sixth lens element is Td, and the following relationship is satisfied:

$$0.65 < \Sigma CT/Td < 0.90.$$

16. The image system lens assembly of claim 15, wherein an Abbe number of the fourth lens element is V4, an Abbe number of the fifth lens element is V5, and the following relationship is satisfied:

$$0.20 < V4/V5 < 0.60.$$

17. The image system lens assembly of claim 15, wherein the focal length of the image system lens assembly is f, a half of a maximal field of view of the image system lens assembly is HFOV, and the following relationship is satisfied:

$$3.0\text{ mm} < \tan(HFOV) < 6.0\text{ mm}.$$

18. The image system lens assembly of claim 14, wherein the image-side surface of the fifth lens element is concave.

19. The image system lens assembly of claim 18, wherein an object-side surface of the fourth lens element is concave, and an image-side surface of the fourth lens element is convex.

20. The image system lens assembly of claim 18, wherein the object-side surface of the fifth lens element changes from convex at a paraxial region to concave at a peripheral region, and the image-side surface of the fifth lens element changes from concave at a paraxial region to convex at a peripheral region.

21. The image system lens assembly of claim 18, wherein an axial distance between the first lens element and the second lens element is T12, an axial distance between the second lens element and the third lens element is T23, an axial distance between the third lens element and the fourth lens element is T34, an axial distance between the fourth lens element and the fifth lens element is T45, an axial distance between the fifth lens element and the sixth lens element is T56, and the following relationships are satisfied:

$$T23 > T12;$$

$$T23 > T34;$$

$$T23 > T45;\text{ and}$$

$$T23 > T56.$$

22. The image system lens assembly of claim 13, wherein a maximum image height of the image system lens assembly is ImgH, an axial distance between the object-side surface of the first lens element and an image plane is TTL, and the following relationship is satisfied:

$$TTL/ImgH < 1.8.$$

23. An image system lens assembly comprising, in order from an object side to an image side:
   a first lens element with negative refractive power having a convex object-side surface and a concave image-side surface;
   a second lens element with positive refractive power;
   a third lens element with refractive power;
   a fourth lens element with negative refractive power;
   a fifth lens element with positive refractive power made of plastic material, wherein at least one of an object-side surface and an image-side surface of the fifth lens element is aspheric; and
   a sixth lens element with refractive power made of plastic material, and having a convex object-side surface and a concave image-side surface, wherein the image-side surface of the sixth lens element changes from concave at a paraxial region to convex at a peripheral region, and at least one of the object-side surface and the image-side surface of the sixth lens element is aspheric;
   wherein a focal length of the image system lens assembly is f, a focal length of the second lens element is f2, a half of a maximal field of view of the image system lens assembly is HFOV, and the following relationships are satisfied:

$$3.0\text{ mm} \le f/\tan(HFOV) < 6.0\text{ mm};\text{ and}$$

$$0.7 < f/f2 < 2.4.$$

24. The image system lens assembly of claim 23, wherein the object-side surface of the fifth lens element is convex, and the image-side surface of the fifth lens element is concave.

25. The image system lens assembly of claim 24, wherein the focal length of the image system lens assembly is f, the focal length of the image system lens assembly is f2, and the following relationship is satisfied:

$1.0 < f/f2 < 1.8$.

26. The image system lens assembly of claim 23, wherein an object-side surface of the fourth lens element is concave, and an image-side surface of the fourth lens element is convex.

27. The image system lens assembly of claim 23, wherein a maximum image height of the image system lens assembly is ImgH, an axial distance between the object-side surface of the first lens element and an image plane is TTL, and the following relationship is satisfied:

$TTL/ImgH < 1.8$.

28. The image system lens assembly of claim 23, wherein the focal length of the image system lens assembly is f, a focal length of the first lens element is f1, the focal length of the second lens element is f2, a focal length of the third lens element is f3, a focal length of the fourth lens element if f4, a focal length of the fifth lens element is f5, a focal length of the sixth lens element is f6, and the following relationship is satisfied:

$f/f2 > f/fi, i = 1,3,4,5,6$.

29. The image system lens assembly of claim 23, wherein a sum of central thicknesses of the first through sixth lens elements is ΣCT, an axial distance between the object-side surface of the first lens element and the image-side surface of the sixth lens element is Td, and the following relationship is satisfied:

$0.65 < \Sigma CT/Td < 0.90$.

* * * * *

UNITED STATES PATENT AND TRADEMARK OFFICE
CERTIFICATE OF CORRECTION

| | | |
|---|---|---|
| PATENT NO. | : 8,687,292 B2 | Page 1 of 1 |
| APPLICATION NO. | : 13/665106 | |
| DATED | : April 1, 2014 | |
| INVENTOR(S) | : Tsung-Han Tsai and Ming-Ta Chou | |

It is certified that error appears in the above-identified patent and that said Letters Patent is hereby corrected as shown below:

On the Title Page

Item (71) of the issued patent, the name of Applicant should be changed to "Largan Precision Co., Ltd., Taichung (TW)".

In the Claims

1. In column 35, line 65, claim 3 of the issued patent, "the focal length the image system lens assembly is f" should be changed to "the focal length of the image system lens assembly is f"; and "a focal length of the fourth lens element if f4" should be changed to "a focal length of the fourth lens element is f4".

2. In column 37, line 64, claim 17 of the issued patent, "3.0 mm<tan(HFOV)<6.0 mm" should be changed to "3.0 mm<f/tan(HFOV)<6.0 mm".

3. In column 39, line 1, claim 25 of the issued patent, "the focal length of the image system lens assembly is f2" should be changed to "the focal length of the second lens element is f2".

4. In column 39, line 19, claim 28 of the issued patent, "a focal length of the fourth lens element if f4" should be changed to "a focal length of the fourth lens element is f4".

Signed and Sealed this
Eighth Day of July, 2014

Michelle K. Lee
*Deputy Director of the United States Patent and Trademark Office*